(12) United States Patent
Noyes

(10) Patent No.: US 9,586,823 B2
(45) Date of Patent: Mar. 7, 2017

(54) SYSTEMS FOR PRODUCING SOLID CARBON BY REDUCING CARBON OXIDES

(71) Applicant: Seerstone LLC, Provo, UT (US)

(72) Inventor: Dallas B. Noyes, Provo, UT (US)

(73) Assignee: Seerstone LLC, Provo, UT (US)

( * ) Notice: Subject to any disclaimer, the term of this patent is extended or adjusted under 35 U.S.C. 154(b) by 0 days.

(21) Appl. No.: 14/775,939

(22) PCT Filed: Mar. 13, 2014

(86) PCT No.: PCT/US2014/026631
§ 371 (c)(1),
(2) Date: Sep. 14, 2015

(87) PCT Pub. No.: WO2014/151898
PCT Pub. Date: Sep. 25, 2014

(65) Prior Publication Data
US 2016/0023902 A1    Jan. 28, 2016

Related U.S. Application Data

(60) Provisional application No. 61/788,474, filed on Mar. 15, 2013.

(51) Int. Cl.
*C01B 31/00* (2006.01)
*C01B 31/02* (2006.01)
(Continued)

(52) U.S. Cl.
CPC .......... *C01B 31/02* (2013.01); *B01J 19/0066* (2013.01); *B01J 19/18* (2013.01); *B01J 2219/00074* (2013.01)

(58) Field of Classification Search
CPC .... B01J 19/00; B01J 19/0053; B01J 19/0066; B01J 19/18; B01J 2219/00049;
(Continued)

(56) References Cited

U.S. PATENT DOCUMENTS

| 1,478,730 A | 12/1923 | Brownlee et al. |
| 1,735,925 A | 11/1929 | Jaeger |

(Continued)

FOREIGN PATENT DOCUMENTS

| JP | 2000072981 A | 3/2000 |
| JP | 2002100787 A | 4/2002 |

(Continued)

OTHER PUBLICATIONS

PCT International Written Opinion, PCT/US2014/026631, dated Aug. 18, 2014.
(Continued)

*Primary Examiner* — Natasha Young
(74) *Attorney, Agent, or Firm* — TraskBritt, P.C.

(57) ABSTRACT

An apparatus for producing solid carbon and water by reducing carbon oxides with a reducing agent in the presence of a catalyst includes a reactor configured to receive reaction gas comprising at least one carbon oxide, at least one reducing agent, and water. The apparatus includes at least one mixing means configured to mix the reagents to form a combined feed, a first heat exchanger configured to heat the combined feed, at least one heater configured to further heat the combined feed, and a reaction vessel configured to receive the combined feed. The reaction vessel is configured to contain a catalyst, to maintain predetermined reaction conditions of temperature and pressure, and has an output configured to deliver a tail gas to the first heat exchanger. The system also includes a product separator, a water separation unit, and a product packaging unit.

20 Claims, 13 Drawing Sheets

(51) Int. Cl.
*C01B 31/04* (2006.01)
*B01J 19/00* (2006.01)
*B01J 19/18* (2006.01)

(58) Field of Classification Search
CPC .... B01J 2219/00051; B01J 2219/00074; B01J 19/24; C01B 31/00; C01B 31/02; C01B 31/0206–31/0407; C01B 31/0438; C01B 31/0446; C01B 31/0484; C01B 31/065
See application file for complete search history.

(56) References Cited

U.S. PATENT DOCUMENTS

| | | |
|---|---|---|
| 1,964,744 A | 7/1934 | Odell |
| 2,429,980 A | 11/1947 | Allinson |
| 2,440,424 A | 4/1948 | Wiegand et al. |
| 2,796,331 A | 6/1957 | Kauffman et al. |
| 3,172,774 A | 3/1965 | Diefendorf |
| 3,378,345 A | 4/1968 | Bourdeau et al. |
| 3,634,999 A | 1/1972 | Howard et al. |
| 4,126,000 A | 11/1978 | Funk |
| 4,602,477 A | 7/1986 | Lucadamo et al. |
| 4,663,230 A | 5/1987 | Tennent |
| 4,710,483 A | 12/1987 | Burk et al. |
| 4,727,207 A | 2/1988 | Paparizos et al. |
| 5,149,584 A | 9/1992 | Baker et al. |
| 5,260,043 A | 11/1993 | Li et al. |
| 5,413,866 A | 5/1995 | Baker et al. |
| 5,456,897 A | 10/1995 | Moy et al. |
| 5,457,343 A | 10/1995 | Ajayan et al. |
| 5,531,424 A | 7/1996 | Whipp |
| 5,569,635 A | 10/1996 | Moy et al. |
| 5,572,544 A | 11/1996 | Mathur et al. |
| 5,578,543 A | 11/1996 | Tennent et al. |
| 5,589,152 A | 12/1996 | Tennent et al. |
| 5,641,466 A | 6/1997 | Ebbesen et al. |
| 5,648,056 A | 7/1997 | Tanaka |
| 5,650,370 A | 7/1997 | Tennent et al. |
| 5,691,054 A | 11/1997 | Tennent et al. |
| 5,707,916 A | 1/1998 | Snyder et al. |
| 5,726,116 A | 3/1998 | Moy et al. |
| 5,747,161 A | 5/1998 | Iijima |
| 5,780,101 A | 7/1998 | Nolan et al. |
| 5,877,110 A | 3/1999 | Snyder et al. |
| 5,965,267 A | 10/1999 | Nolan et al. |
| 5,997,832 A | 12/1999 | Lieber et al. |
| 6,099,965 A | 8/2000 | Tennent et al. |
| 6,159,892 A | 12/2000 | Moy et al. |
| 6,183,714 B1 | 2/2001 | Smalley et al. |
| 6,203,814 B1 | 3/2001 | Fisher et al. |
| 6,221,330 B1 | 4/2001 | Moy et al. |
| 6,232,706 B1 | 5/2001 | Dai et al. |
| 6,239,057 B1 | 5/2001 | Ichikawa et al. |
| 6,261,532 B1 | 7/2001 | Ono |
| 6,262,129 B1 | 7/2001 | Murray et al. |
| 6,294,144 B1 | 9/2001 | Moy et al. |
| 6,333,016 B1 | 12/2001 | Resasco et al. |
| 6,346,189 B1 | 2/2002 | Dai et al. |
| 6,361,861 B2 | 3/2002 | Gao |
| 6,375,917 B1 | 4/2002 | Mandeville et al. |
| 6,413,487 B1 | 7/2002 | Resasco et al. |
| 6,423,288 B2 | 7/2002 | Mandeville et al. |
| 6,426,442 B1 | 7/2002 | Ichikawa et al. |
| 6,465,813 B2 | 10/2002 | Ihm |
| 6,518,218 B1 | 2/2003 | Sun et al. |
| 6,596,101 B2 | 7/2003 | Weihs et al. |
| 6,645,455 B2 | 11/2003 | Margrave et al. |
| 6,683,783 B1 | 1/2004 | Smalley et al. |
| 6,686,311 B2 | 2/2004 | Sun et al. |
| 6,692,717 B1 | 2/2004 | Smalley et al. |
| 6,713,519 B2 | 3/2004 | Wang et al. |
| 6,749,827 B2 | 6/2004 | Smalley et al. |
| 6,761,870 B1 | 7/2004 | Smalley et al. |
| 6,790,425 B1 | 9/2004 | Smalley et al. |
| 6,800,369 B2 | 10/2004 | Gimzewski et al. |
| 6,827,918 B2 | 12/2004 | Margrave et al. |
| 6,827,919 B1 | 12/2004 | Moy et al. |
| 6,835,330 B2 | 12/2004 | Nishino et al. |
| 6,835,366 B1 | 12/2004 | Margrave et al. |
| 6,841,139 B2 | 1/2005 | Liu et al. |
| 6,855,301 B1 | 2/2005 | Rich et al. |
| 6,875,412 B2 | 4/2005 | Margrave et al. |
| 6,890,986 B2 | 5/2005 | Pruett |
| 6,899,945 B2 | 5/2005 | Smalley et al. |
| 6,905,544 B2 | 6/2005 | Setoguchi et al. |
| 6,913,740 B2 | 7/2005 | Polverejan et al. |
| 6,913,789 B2 | 7/2005 | Smalley et al. |
| 6,916,434 B2 | 7/2005 | Nishino et al. |
| 6,919,064 B2 | 7/2005 | Resasco et al. |
| 6,936,233 B2 | 8/2005 | Smalley et al. |
| 6,949,237 B2 | 9/2005 | Smalley et al. |
| 6,955,800 B2 | 10/2005 | Resasco et al. |
| 6,960,389 B2 | 11/2005 | Tennent et al. |
| 6,962,685 B2 | 11/2005 | Sun |
| 6,979,709 B2 | 12/2005 | Smalley et al. |
| 6,986,876 B2 | 1/2006 | Smalley et al. |
| 6,998,358 B2 | 2/2006 | French et al. |
| 7,011,771 B2 | 3/2006 | Gao et al. |
| 7,041,620 B2 | 5/2006 | Smalley et al. |
| 7,045,108 B2 | 5/2006 | Jiang et al. |
| 7,048,999 B2 | 5/2006 | Smalley et al. |
| 7,052,668 B2 | 5/2006 | Smalley et al. |
| 7,067,098 B2 | 6/2006 | Colbert et al. |
| 7,071,406 B2 | 7/2006 | Smalley et al. |
| 7,074,379 B2 | 7/2006 | Moy et al. |
| 7,094,385 B2 | 8/2006 | Beguin et al. |
| 7,094,386 B2 | 8/2006 | Resasco et al. |
| 7,094,679 B1 | 8/2006 | Li et al. |
| 7,097,820 B2 | 8/2006 | Colbert et al. |
| 7,105,596 B2 | 9/2006 | Smalley et al. |
| 7,125,534 B1 | 10/2006 | Smalley et al. |
| 7,132,062 B1 | 11/2006 | Howard |
| 7,135,159 B2 | 11/2006 | Shaffer et al. |
| 7,135,160 B2 | 11/2006 | Yang et al. |
| 7,150,864 B1 | 12/2006 | Smalley et al. |
| 7,157,068 B2 | 1/2007 | Li et al. |
| 7,160,532 B2 | 1/2007 | Liu et al. |
| 7,169,329 B2 | 1/2007 | Wong et al. |
| 7,201,887 B2 | 4/2007 | Smalley et al. |
| 7,204,970 B2 | 4/2007 | Smalley et al. |
| 7,205,069 B2 | 4/2007 | Smalley et al. |
| 7,214,360 B2 | 5/2007 | Chen et al. |
| 7,250,148 B2 | 7/2007 | Yang et al. |
| 7,270,795 B2 * | 9/2007 | Kawakami ............ B82Y 30/00 423/447.1 |
| 7,291,318 B2 | 11/2007 | Sakurabayashi et al. |
| 7,338,648 B2 | 3/2008 | Harutyunyan et al. |
| 7,365,289 B2 | 4/2008 | Wilkes et al. |
| 7,374,793 B2 | 5/2008 | Furukawa et al. |
| 7,390,477 B2 | 6/2008 | Smalley et al. |
| 7,396,798 B2 | 7/2008 | Ma et al. |
| 7,408,186 B2 | 8/2008 | Merkulov et al. |
| 7,410,628 B2 | 8/2008 | Bening et al. |
| 7,413,723 B2 | 8/2008 | Niu et al. |
| 7,452,828 B2 | 11/2008 | Hirakata et al. |
| 7,459,137 B2 | 12/2008 | Tour et al. |
| 7,459,138 B2 | 12/2008 | Resasco et al. |
| 7,473,873 B2 | 1/2009 | Biris et al. |
| 7,510,695 B2 | 3/2009 | Smalley et al. |
| 7,527,780 B2 | 5/2009 | Margrave et al. |
| 7,563,427 B2 | 7/2009 | Wei et al. |
| 7,563,428 B2 | 7/2009 | Resasco et al. |
| 7,569,203 B2 | 8/2009 | Fridman et al. |
| 7,572,426 B2 | 8/2009 | Strano et al. |
| 7,585,483 B2 | 9/2009 | Edwin et al. |
| 7,601,322 B2 | 10/2009 | Huang |
| 7,611,579 B2 | 11/2009 | Lashmore et al. |
| 7,615,204 B2 | 11/2009 | Ajayan et al. |
| 7,618,599 B2 | 11/2009 | Kim et al. |
| 7,622,059 B2 | 11/2009 | Bordere et al. |
| 7,632,569 B2 | 12/2009 | Smalley et al. |
| 7,645,933 B2 | 1/2010 | Narkis et al. |
| 7,655,302 B2 | 2/2010 | Smalley et al. |
| 7,670,510 B2 | 3/2010 | Wong et al. |

(56) References Cited

U.S. PATENT DOCUMENTS

| | | |
|---|---|---|
| 7,700,065 B2 | 4/2010 | Fujioka et al. |
| 7,704,481 B2 | 4/2010 | Higashi et al. |
| 7,719,265 B2 | 5/2010 | Harutyunyan et al. |
| 7,731,930 B2 | 6/2010 | Taki et al. |
| 7,736,741 B2 | 6/2010 | Maruyama et al. |
| 7,740,825 B2 | 6/2010 | Tohji et al. |
| 7,749,477 B2 | 7/2010 | Jiang et al. |
| 7,754,182 B2 | 7/2010 | Jiang et al. |
| 7,772,447 B2 | 8/2010 | Iaccino et al. |
| 7,780,939 B2 | 8/2010 | Margrave et al. |
| 7,785,558 B2 | 8/2010 | Hikata |
| 7,790,228 B2 | 9/2010 | Suekane et al. |
| 7,794,690 B2 | 9/2010 | Abatzoglou et al. |
| 7,794,797 B2 | 9/2010 | Vasenkov |
| 7,799,246 B2 | 9/2010 | Bordere et al. |
| 7,811,542 B1 | 10/2010 | McElrath et al. |
| 7,824,648 B2 | 11/2010 | Jiang et al. |
| 7,837,968 B2 | 11/2010 | Chang et al. |
| 7,838,843 B2 | 11/2010 | Kawakami et al. |
| 7,842,271 B2 | 11/2010 | Petrik |
| 7,854,945 B2 | 12/2010 | Fischer et al. |
| 7,854,991 B2 | 12/2010 | Hata et al. |
| 7,858,648 B2 | 12/2010 | Bianco et al. |
| 7,871,591 B2 | 1/2011 | Harutyunyan et al. |
| 7,879,398 B2 | 2/2011 | Kim et al. |
| 7,883,995 B2 | 2/2011 | Mitchell et al. |
| 7,887,774 B2 | 2/2011 | Strano et al. |
| 7,888,543 B2 | 2/2011 | Iaccino et al. |
| 7,897,209 B2 | 3/2011 | Shibuya et al. |
| 7,901,654 B2 | 3/2011 | Harutyunyan |
| 7,906,095 B2 | 3/2011 | Kawabata |
| 7,923,403 B2 | 4/2011 | Ma et al. |
| 7,923,615 B2 | 4/2011 | Silvy et al. |
| 7,932,419 B2 | 4/2011 | Liu et al. |
| 7,947,245 B2 | 5/2011 | Tada et al. |
| 7,951,351 B2 | 5/2011 | Ma et al. |
| 7,964,174 B2 | 6/2011 | Dubin et al. |
| 7,981,396 B2 | 7/2011 | Harutyunyan |
| 7,988,861 B2 | 8/2011 | Pham-Huu et al. |
| 7,993,594 B2 | 8/2011 | Wei et al. |
| 8,012,447 B2 | 9/2011 | Harutyunyan et al. |
| 8,017,892 B2 | 9/2011 | Biris et al. |
| 8,038,908 B2 | 10/2011 | Hirai et al. |
| 8,114,518 B2 | 2/2012 | Hata et al. |
| 8,138,384 B2 | 3/2012 | Iaccino et al. |
| 8,173,096 B2 | 5/2012 | Chang et al. |
| 8,178,049 B2 | 5/2012 | Shiraki et al. |
| 8,226,902 B2 | 7/2012 | Jang et al. |
| 8,314,044 B2 | 11/2012 | Jangbarwala |
| 8,486,362 B2 | 7/2013 | Fugetsu |
| 8,679,444 B2 | 3/2014 | Noyes |
| 8,865,613 B2 | 10/2014 | Mordkovich et al. |
| 9,090,472 B2 | 7/2015 | Noyes |
| 9,221,685 B2 | 12/2015 | Noyes |
| 9,327,970 B2 | 5/2016 | Nakamura et al. |
| 2002/0054849 A1 | 5/2002 | Baker et al. |
| 2002/0102193 A1 | 8/2002 | Smalley et al. |
| 2002/0102196 A1 | 8/2002 | Smalley et al. |
| 2002/0127169 A1 | 9/2002 | Smalley et al. |
| 2002/0127170 A1 | 9/2002 | Hong et al. |
| 2002/0172767 A1 | 11/2002 | Grigorian et al. |
| 2002/0173420 A1 | 11/2002 | Cantrell et al. |
| 2003/0059364 A1 | 3/2003 | Prilutskiy |
| 2003/0147802 A1 | 8/2003 | Smalley et al. |
| 2004/0035355 A1 | 2/2004 | Avouris et al. |
| 2004/0053440 A1 | 3/2004 | Lai et al. |
| 2004/0070009 A1 | 4/2004 | Resasco et al. |
| 2004/0105807 A1 | 6/2004 | Fan et al. |
| 2004/0111968 A1 | 6/2004 | Day et al. |
| 2004/0150312 A1 | 8/2004 | McElrath et al. |
| 2004/0194705 A1 | 10/2004 | Dai et al. |
| 2004/0197260 A1 | 10/2004 | Resasco et al. |
| 2004/0202603 A1 | 10/2004 | Fischer et al. |
| 2004/0234445 A1 | 11/2004 | Serp et al. |
| 2004/0247503 A1 | 12/2004 | Hyeon |
| 2004/0265212 A1 | 12/2004 | Varadan et al. |
| 2005/0002850 A1 | 1/2005 | Niu et al. |
| 2005/0002851 A1 | 1/2005 | McElrath et al. |
| 2005/0025695 A1 | 2/2005 | Pradhan |
| 2005/0042162 A1 | 2/2005 | Resasco et al. |
| 2005/0046322 A1 | 3/2005 | Kim et al. |
| 2005/0074392 A1 | 4/2005 | Yang et al. |
| 2005/0079118 A1 | 4/2005 | Maruyama et al. |
| 2005/0100499 A1 | 5/2005 | Oya et al. |
| 2005/0176990 A1 | 8/2005 | Coleman et al. |
| 2005/0238810 A1 | 10/2005 | Scaringe et al. |
| 2005/0244325 A1 | 11/2005 | Nam et al. |
| 2005/0276743 A1 | 12/2005 | Lacombe et al. |
| 2006/0013757 A1 | 1/2006 | Edwin et al. |
| 2006/0045837 A1 | 3/2006 | Nishimura |
| 2006/0078489 A1 | 4/2006 | Harutyunyan et al. |
| 2006/0104884 A1 | 5/2006 | Shaffer et al. |
| 2006/0104886 A1 | 5/2006 | Wilson |
| 2006/0104887 A1 | 5/2006 | Fujioka et al. |
| 2006/0133990 A1 | 6/2006 | Hyeon et al. |
| 2006/0165988 A1 | 7/2006 | Chiang et al. |
| 2006/0191835 A1 | 8/2006 | Petrik et al. |
| 2006/0199770 A1 | 9/2006 | Bianco et al. |
| 2006/0204426 A1 | 9/2006 | Akins et al. |
| 2006/0225534 A1 | 10/2006 | Swihart et al. |
| 2006/0239890 A1 | 10/2006 | Chang et al. |
| 2006/0239891 A1 | 10/2006 | Niu et al. |
| 2006/0245996 A1 | 11/2006 | Xie et al. |
| 2006/0275956 A1 | 12/2006 | Konesky |
| 2006/0286022 A1 | 12/2006 | Miyamoto et al. |
| 2007/0003470 A1 | 1/2007 | Smalley et al. |
| 2007/0020168 A1 | 1/2007 | Asmussen et al. |
| 2007/0031320 A1 | 2/2007 | Jiang et al. |
| 2007/0116631 A1 | 5/2007 | Li et al. |
| 2007/0148962 A1 | 6/2007 | Kauppinen et al. |
| 2007/0149392 A1 | 6/2007 | Ku et al. |
| 2007/0172409 A1 | 7/2007 | Hikata |
| 2007/0183959 A1 | 8/2007 | Charlier et al. |
| 2007/0189953 A1 | 8/2007 | Bai et al. |
| 2007/0207318 A1 | 9/2007 | Jin et al. |
| 2007/0209093 A1 | 9/2007 | Tohji et al. |
| 2007/0253886 A1 | 11/2007 | Abatzoglou et al. |
| 2007/0264187 A1 | 11/2007 | Harutyunyan et al. |
| 2007/0280876 A1 | 12/2007 | Tour et al. |
| 2007/0281087 A1 | 12/2007 | Harutyunyan et al. |
| 2008/0003170 A1 | 1/2008 | Buchholz et al. |
| 2008/0003182 A1 | 1/2008 | Wilson et al. |
| 2008/0008760 A1 | 1/2008 | Bianco et al. |
| 2008/0014654 A1 | 1/2008 | Weisman et al. |
| 2008/0095695 A1 | 4/2008 | Shanov et al. |
| 2008/0118426 A1 | 5/2008 | Li et al. |
| 2008/0160312 A1 | 7/2008 | Furukawa et al. |
| 2008/0169061 A1 | 7/2008 | Tour et al. |
| 2008/0176069 A1 | 7/2008 | Ma et al. |
| 2008/0193367 A1 | 8/2008 | Kalck et al. |
| 2008/0217588 A1 | 9/2008 | Arnold et al. |
| 2008/0221227 A1 | 9/2008 | Christensen et al. |
| 2008/0226538 A1 | 9/2008 | Rumpf et al. |
| 2008/0233402 A1 | 9/2008 | Carlson et al. |
| 2008/0239620 A1 | 10/2008 | Min et al. |
| 2008/0260618 A1 | 10/2008 | Kawabata |
| 2008/0263954 A1 | 10/2008 | Hammel et al. |
| 2008/0274277 A1 | 11/2008 | Rashidi et al. |
| 2008/0279753 A1 | 11/2008 | Harutyunyan |
| 2008/0280136 A1 | 11/2008 | Zachariah et al. |
| 2008/0296537 A1 | 12/2008 | Gordon et al. |
| 2008/0299029 A1 | 12/2008 | Grosboll et al. |
| 2008/0305028 A1 | 12/2008 | McKeigue et al. |
| 2008/0305029 A1 | 12/2008 | McKeigue et al. |
| 2008/0305030 A1 | 12/2008 | McKeigue et al. |
| 2009/0001326 A1 | 1/2009 | Sato et al. |
| 2009/0004075 A1 | 1/2009 | Chung et al. |
| 2009/0011128 A1 | 1/2009 | Oshima et al. |
| 2009/0022652 A1 | 1/2009 | Sato et al. |
| 2009/0035569 A1 | 2/2009 | Gonzalez Moral et al. |
| 2009/0056802 A1 | 3/2009 | Rabani |
| 2009/0074634 A1 | 3/2009 | Tada et al. |
| 2009/0075157 A1 | 3/2009 | Pak et al. |
| 2009/0081454 A1 | 3/2009 | Axmann et al. |

(56) References Cited

U.S. PATENT DOCUMENTS

| | | |
|---|---|---|
| 2009/0087622 A1 | 4/2009 | Busnaina et al. |
| 2009/0124705 A1 | 5/2009 | Meyer et al. |
| 2009/0136413 A1 | 5/2009 | Li et al. |
| 2009/0140215 A1 | 6/2009 | Buchholz et al. |
| 2009/0176100 A1 | 7/2009 | Higashi et al. |
| 2009/0186223 A1 | 7/2009 | Saito et al. |
| 2009/0191352 A1 | 7/2009 | DuFaux et al. |
| 2009/0203519 A1 | 8/2009 | Abatzoglou et al. |
| 2009/0208388 A1 | 8/2009 | McKeigue et al. |
| 2009/0208708 A1 | 8/2009 | Wei et al. |
| 2009/0220392 A1 | 9/2009 | McKeigue et al. |
| 2009/0226704 A1 | 9/2009 | Kauppinen et al. |
| 2009/0257945 A1 | 10/2009 | Biris et al. |
| 2009/0286084 A1 | 11/2009 | Tennent et al. |
| 2009/0286675 A1 | 11/2009 | Wei et al. |
| 2009/0294753 A1 | 12/2009 | Hauge et al. |
| 2009/0297846 A1 | 12/2009 | Hata et al. |
| 2009/0297847 A1 | 12/2009 | Kim et al. |
| 2009/0301349 A1 | 12/2009 | Afzali-Ardakani et al. |
| 2010/0009204 A1 | 1/2010 | Noguchi et al. |
| 2010/0034725 A1 | 2/2010 | Harutyunyan |
| 2010/0047152 A1 | 2/2010 | Whelan et al. |
| 2010/0062229 A1 | 3/2010 | Hata et al. |
| 2010/0065776 A1 | 3/2010 | Han et al. |
| 2010/0074811 A1 | 3/2010 | Mckeigue et al. |
| 2010/0081568 A1 | 4/2010 | Bedworth |
| 2010/0104808 A1 | 4/2010 | Fan et al. |
| 2010/0104849 A1 | 4/2010 | Lashmore et al. |
| 2010/0129654 A1 | 5/2010 | Jiang et al. |
| 2010/0132883 A1 | 6/2010 | Burke et al. |
| 2010/0158788 A1 | 6/2010 | Kim et al. |
| 2010/0159222 A1 | 6/2010 | Hata et al. |
| 2010/0160155 A1 | 6/2010 | Liang |
| 2010/0167053 A1 | 7/2010 | Sung et al. |
| 2010/0173037 A1 | 7/2010 | Jiang et al. |
| 2010/0173153 A1 | 7/2010 | Hata et al. |
| 2010/0196249 A1 | 8/2010 | Hata et al. |
| 2010/0209696 A1 | 8/2010 | Seals et al. |
| 2010/0213419 A1 | 8/2010 | Jiang et al. |
| 2010/0221173 A1 | 9/2010 | Tennent et al. |
| 2010/0222432 A1 | 9/2010 | Hua |
| 2010/0226848 A1 | 9/2010 | Nakayama et al. |
| 2010/0230642 A1 | 9/2010 | Kim et al. |
| 2010/0258446 A1 | 10/2010 | Mohapatra et al. |
| 2010/0260927 A1 | 10/2010 | Gordon et al. |
| 2010/0278717 A1 | 11/2010 | Suzuki et al. |
| 2010/0298125 A1 | 11/2010 | Kim et al. |
| 2010/0303675 A1 | 12/2010 | Suekane et al. |
| 2010/0316562 A1 | 12/2010 | Carruthers et al. |
| 2010/0317790 A1 | 12/2010 | Jang et al. |
| 2010/0320437 A1 | 12/2010 | Gordon et al. |
| 2011/0008617 A1 | 1/2011 | Hata et al. |
| 2011/0014368 A1 | 1/2011 | Vasenkov |
| 2011/0020211 A1 | 1/2011 | Jayatissa |
| 2011/0024697 A1 | 2/2011 | Biris et al. |
| 2011/0027162 A1 | 2/2011 | Steiner, III et al. |
| 2011/0027163 A1 | 2/2011 | Shinohara et al. |
| 2011/0033367 A1 | 2/2011 | Riehl et al. |
| 2011/0039124 A1 | 2/2011 | Ikeuchi et al. |
| 2011/0053020 A1 | 3/2011 | Norton et al. |
| 2011/0053050 A1 | 3/2011 | Lim et al. |
| 2011/0060087 A1 | 3/2011 | Noguchi et al. |
| 2011/0085961 A1 | 4/2011 | Noda et al. |
| 2011/0110842 A1 | 5/2011 | Haddon |
| 2011/0120138 A1 | 5/2011 | Gaiffi et al. |
| 2011/0142745 A1 | 6/2011 | Feng et al. |
| 2011/0150746 A1 | 6/2011 | Khodadadi et al. |
| 2011/0155964 A1 | 6/2011 | Arnold et al. |
| 2011/0158892 A1 | 6/2011 | Yamaki |
| 2011/0171109 A1 | 7/2011 | Petrik |
| 2011/0174145 A1 | 7/2011 | Ogrin et al. |
| 2011/0206469 A1 | 8/2011 | Furuyama et al. |
| 2011/0212016 A1 | 9/2011 | Lee et al. |
| 2012/0034150 A1 | 2/2012 | Noyes |
| 2012/0080313 A1 | 4/2012 | Baumgart et al. |
| 2012/0083408 A1 | 4/2012 | Sato et al. |
| 2012/0107610 A1 | 5/2012 | Moravsky et al. |
| 2012/0137664 A1 | 6/2012 | Shawabkeh et al. |
| 2012/0148476 A1 | 6/2012 | Hata et al. |
| 2012/0149824 A1 | 6/2012 | Hocke et al. |
| 2012/0258371 A1 | 10/2012 | Nakanishi et al. |
| 2013/0315813 A1 | 11/2013 | Chang et al. |
| 2014/0021827 A1 | 1/2014 | Noyes |
| 2014/0086820 A1 | 3/2014 | Nakamura et al. |
| 2014/0141248 A1 | 5/2014 | Noyes |
| 2014/0348739 A1 | 11/2014 | Denton et al. |
| 2015/0059527 A1 | 3/2015 | Noyes |
| 2015/0059571 A1 | 3/2015 | Denton et al. |
| 2015/0064092 A1 | 3/2015 | Noyes |
| 2015/0064096 A1 | 3/2015 | Noyes |
| 2015/0064097 A1 | 3/2015 | Noyes |
| 2015/0071848 A1 | 3/2015 | Denton et al. |
| 2015/0078981 A1 | 3/2015 | Noyes |
| 2015/0086468 A1 | 3/2015 | Noyes |
| 2015/0093323 A1 | 4/2015 | Koveal, Jr. et al. |
| 2015/0114819 A1 | 4/2015 | Denton et al. |
| 2015/0147259 A1 | 5/2015 | Noyes |
| 2015/0147261 A1 | 5/2015 | Denton et al. |
| 2015/0225242 A1 | 8/2015 | Noyes |
| 2015/0291424 A1 | 10/2015 | Noyes |
| 2015/0321918 A1 | 11/2015 | Noyes |
| 2016/0016794 A1 | 1/2016 | Noyes |
| 2016/0016800 A1 | 1/2016 | Noyes |
| 2016/0016862 A1 | 1/2016 | Noyes |
| 2016/0023902 A1 | 1/2016 | Noyes |
| 2016/0027934 A1 | 1/2016 | Noyes |
| 2016/0030925 A1 | 2/2016 | Noyes |
| 2016/0030926 A1 | 2/2016 | Noyes |
| 2016/0031710 A1 | 2/2016 | Noyes et al. |
| 2016/0039677 A1 | 2/2016 | Noyes |
| 2016/0156051 A1 | 6/2016 | Chua et al. |

FOREIGN PATENT DOCUMENTS

| | | |
|---|---|---|
| JP | 3339339 B2 | 10/2002 |
| JP | 2004360099 A | 12/2004 |
| JP | 2005272277 A | 10/2005 |
| WO | 0230816 A1 | 4/2002 |
| WO | 03018474 A1 | 3/2003 |
| WO | 2005103348 A1 | 11/2005 |
| WO | 2006003482 A2 | 1/2006 |
| WO | 2006130150 A2 | 12/2006 |
| WO | 2007126412 A2 | 11/2007 |
| WO | 2009122139 A1 | 10/2009 |
| WO | 2009145959 A1 | 12/2009 |
| WO | 2010087903 A1 | 8/2010 |
| WO | 2010146169 A2 | 12/2010 |
| WO | 2011009071 A1 | 1/2011 |
| WO | 2014/151898 | 9/2014 |

OTHER PUBLICATIONS

PCT International Preliminary Report on Patentability, PCT/US2014/026631, dated Sep. 15, 2015.
PCT International Search Report, PCT/US2014/026631, dated Aug. 18, 2014.
Abatzoglou, Nicolas et al., "The use of catalytic reforming reactions for C02 sequestration as carbon nanotube," Proceedings of the 2006 IASME/WSEAS International Conference on Energy & Environmental Systems, Chalkida, Greece, May 8-10, 2006 (pp. 21-26) (available at: http://www.wseas.us/e-library/conferences/2006evia/papers/516-19 3.pdf).
Abatzoglou, Nicolas et al., "Green Diesel from Fischer-Tropsch Synthesis: Challenges and Hurdles," Proc. of the 3rd IASME/WSEAS Int. Cont on Energy, Environment, Ecosystems and Sustainable Development, Agios Nikolaos, Greece, Jul. 24-26, 2007, pp. 223-232.
Baker, B. A and G. D. Smith "Metal Dusting in a Laboratory Environment—Alloying Addition Effects," Special Metals Corporation, undated.

(56) References Cited

OTHER PUBLICATIONS

Baker, B. A. and G. D. Smith, "Alloy Solutions to Metal Dusting Problems in the PetroChemical Industry," Special Metals Corporation, undated.
Database WPI Week 198920 Thomson Scientific, London, GB; AN 1989-148422 XP002719593, & JP H01 92425 A (Nippon Kokan KK) Apr. 11, 1989 (Apr. 11, 1989).
Cha, S. I., et al., "Mechanical and electrical properties of cross-linked carbon nanotubes," Carbon 46 (2008) 482-488, Elsevier, Ltd.
Cheng, H.M. et al., "Large-scale and low-cost synthesis of single-walled carbon nanotubes by the catalytic pyrolysis of hydrocarbons," Applied Physics Letters 72:3282-3284, Jun. 22, 1998 (available at: http://carbon.imr.ac.cn/file/journal/1998/98_APL_72_3282-ChengH M.pdf).
Chun, Changmin, and Ramanarayanan, Trikur A., "Metal Dusting Corrosion of Metals and Alloys," 2007.
Chung, U.C., and W.S. Chung, "Mechanism on Growth of Carbon Nanotubes Using CO—H2 Gas Mixture," Materials Science Forum vols. 475-479 (2005) pp. 3551-3554.
Dai, et al., "Single-wall nanotubes produced by metal-catalyzed disproportionation of carbon monoxide," Chemical Physics Letters 260 (1996) 471-475, Elsevier.
Dresselhaus et al., Carbon Nanotubes Synthesis, Structure, Properties, and Applications. 2001, pp. 1-9, Springer.
Garmirian, James Edwin, "Carbon Deposition in a Bosch Process Using a Cobalt and Nickel Catalyst," PhD Dissertation, Massachusetts Institute of Technology, Mar. 1980, pp. 14-185.
Grobert, Nicole, "Carbon nanotubes—becoming clean," Materials Today, vol. 10, No. 1-2, Jan.-Feb. 2007, Elsevier, pp. 28-35.
Hata, Kenji, "From Highly Efficient Impurity-Free CNT Synthesis to DWNT forests, CNTsolids and Super-Capacitors," unknown date, unknown publisher, Research Center for Advanced Carbon Materials, National Institute of Advanced Industrial Science and Technology (AIST), Tsukuba, 305-8565, Japan, Feb. 2, 2007.
Hiraoka, Tatsuki, et al., "Synthesis of Single- and Double-Walled Carbon Nanotube Forests on Conducting Metal Foils," 9 J. Am. Chem. Soc. 2006, 128, 13338-13339.
Holmes, et al.; A Carbon Dioxide Reduction Unit Using Bosch Reaction and Expendable Catalyst Cartridges; NASA; 1970; available at https://archive.org/details/nasa_techdoc_19710002858.
Huang, Z.P., et al., "Growth of highly oriented carbon nanotubes by plasma-enhanced hot filament chemical vapor deposition," Applied Physics Letters 73:3845-3847, Dec. 28, 1998.
"INCONEL® alloy 693—Excellent Resistance to Metal Dusting and High Temperature Corrosion" Special Metals Product Sheet, 2005.
Unknown author, "Metal Dusting," unknown publisher, undated.
Krestinin, A. V., et al. "Kinetics of Growth of Carbon Fibers on an Iron Catalyst in Methane Pyrolysis: A Measurement Procedure with the Use of an Optical Microscope," Kinetics and Catalysis, 2008, vol. 49, No. 1, pp. 58-78.
Lal, Archit, "Effect of Gas Composition and Carbon Activity on the Growth of Carbon Nanotubes," Masters Thesis, University of Florida, 2003.
Unknown author, "Metal Dusting of reducing gas furnace HK40 tube," unknown publisher, undated.
Manning, Michael Patrick, "An Investigation of the Bosch Process," PhD Dissertation, Massachusetts Institute of Technology, Jan. 1976.
Muller-Lorenz and Grabke, Coking by metal dusting of steels, 1999, Materials and Corrosion 50, 614-621 (1999).
SAE 820875 Utilization of Ruthenium and Ruthenium-Iron Alloys as Bosch Process Catalysts. Jul. 19-21, 1982.
SAE 911451 Optimization of Bosch Reaction, Jul. 15-18, 1991.
Nasibulin, Albert G., et al., "An essential role of C02 and H20 during single-walled CNT synthesis from carbon monoxide," Chemical Physics Letters 417 (2005) 179-184.
Nasibulin, Albert G., et al., "Correlation between catalyst particle and single-walled carbon nanotube diameters," Carbon 43 (2005) 2251-2257.
Noordin, Mohamad and Kong Yong Liew, "Synthesis of Alumina Nanofibers and Composites," in Nanofibers, pp. 405-418 (Ashok Kumar, ed., 2010) ISBN 978-953-7619-86-2 (available at http://www.intechopen.com/books/nanofibers/synthesis-of-alumina-nanofibers-and-composites).
Pender, Mark J., et al., "Molecular and polymeric precursors to boron carbide nanofibers, nanocylinders, and nanoporous ceramics," Pure Appl. Chem., vol. 75, No. 9, pp. 1287-1294, 2003.
Ruckenstein, E and H.Y. Wang, "Carbon Deposition and Catalytic Deactivation during C02 Reforming of CH4 over Co/?-Al2O3 Catalysts," Journal of Catalysis, vol. 205, Issue 2, Jan. 25, 2002, pp. 289-293.
Sacco, Albert Jr., "An Investigation of the Reactions of Carbon Dioxide, Carbon Monoxide, Methane, Hydrogen, and Water over Iron, Iron Carbides, and Iron Oxides," PhD Dissertation, Massachusetts Institute of Technology, Jul. 1977, pp. 2, 15-234.
Skulason, Egill, Metallic and Semiconducting Properties of Carbon Nanotubes, Modern Physics, Nov. 2005, slide presentation, 21 slides, available at https://notendur.hi.is/egillsk/stuff/annad/Egiii.Slides2.pdf, last visited Apr. 28, 2014.
Songsasen, Apisit and Paranchai Pairgreethaves, "Preparation of Carbon Nanotubes by Nickel Catalyzed Decomposition of Liquefied Petroleum Gas (LPG)," Kasetsart J. (Nat. Sci.) 35 : 354-359 (2001) (available at: http://kasetsartjournal.ku.ac.th/kuj_files/2008/A0804251023348734.pdf).
Szakalos, P., "Mechanisms and driving forces of metal dusting," Materials and Corrosion, 2003, 54, No. 10, pp. 752-762.
Tsai, Heng-Yi, et al., "A feasibility study of preparing carbon nanotubes by using a metal dusting process," Diamond & Related Materials 18 (2009) 324-327, Elsevier.
Wilson, Richard B., "Fundamental Investigation of the Bosch Reaction," Master's Thesis, Massachusetts Institute of Technology, Sep. 1971, pp. 12,23, 37, 43, 44, 62, 70, 80, 83-88, 98.
Wei, et al. "The mass production of carbon nanotubes using a nano-agglomerate fluidized bed reactor: A multiscale space-time analysis," Powder Technology 183 (2008) 10-20, Elsevier.
Zeng, Z., and Natesan, K., Relationship between the Growth of Carbon Nanofilaments and Metal Dusting Corrosion, 2005, Chem. Mater. 2005, 17, 3794-3801.
Camilli et al., The synthesis and characterization of carbon nanotubes grown by chemical vapor deposition using a stainless steel catalyst, Carbon, 2011, pp. 3307-3315, vol. 49, No. 10.

* cited by examiner

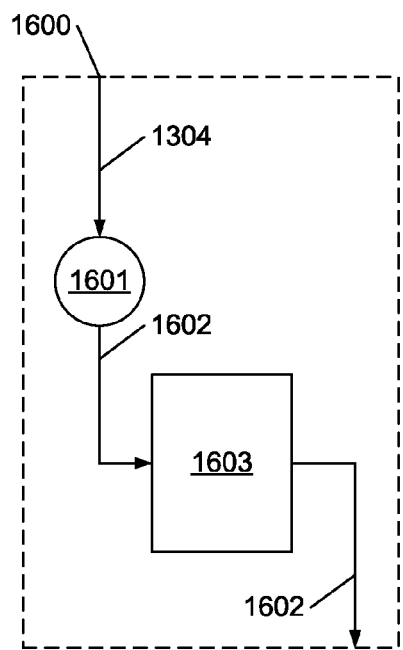
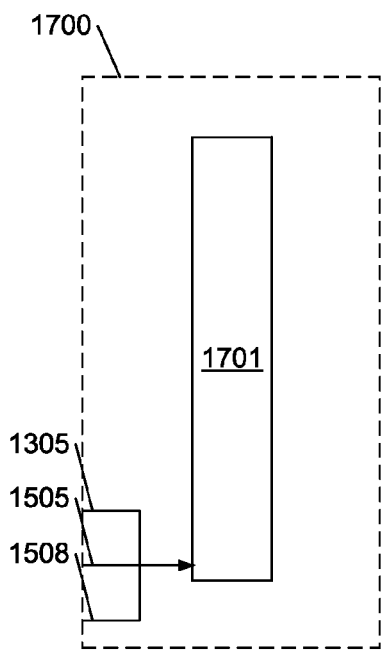
FIG. 16
FIG. 17
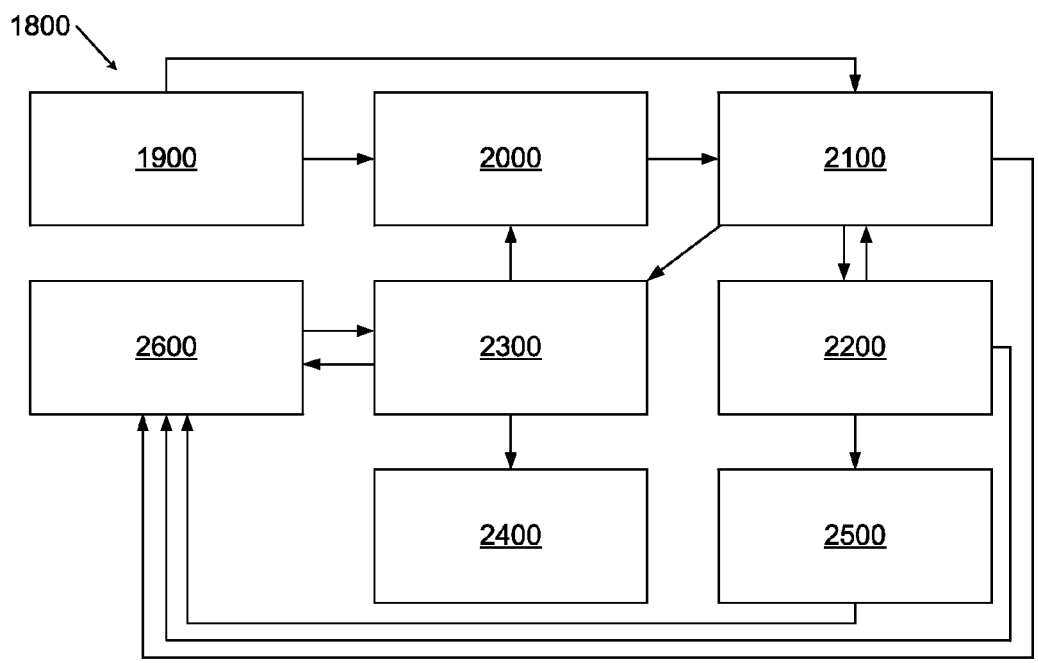
FIG. 18

SYSTEMS FOR PRODUCING SOLID CARBON BY REDUCING CARBON OXIDES

PRIORITY CLAIM

This application is a U.S. national phase entry of International Patent Application No. PCT/US2014/026631, now WO 2014/151898, filed on Mar. 13, 2014, which claims the benefit of the filing date of U.S. Provisional Patent Application Ser. No. 61/788,474, filed Mar. 15, 2013, for "Systems for Producing Solid Carbon by Reducing Carbon Oxides," the contents of which are incorporated herein by this reference.

FIELD

Embodiments of the present disclosure relate to reactors, systems, and methods for forming products from a reactive gas in the presence of a catalyst. For example, methods disclosed herein may be used to form various allotropes and morphologies of solid carbon, including carbon nanotubes.

BACKGROUND

Continuous production of solid products from reactive gases typically entails reacting the reactive gases in the presence of a catalyst in such a way that the solid products are elutriated from the surface of the catalyst. The solid products are thus swept away from the catalyst and subsequently harvested in a suitable process or series of processes for removing particulates from reaction tail-gases. Reactors conventionally used for such continuous solid production include fluidized-bed reactors, fixed bed reactors, pulsed bed reactors, shaft kilns, etc. Particulate removal devices typically include cyclones, bag houses, electrostatic precipitators, scrubbers, etc.

Various morphologies and allotropes of carbon are used industrially, such as for fuel, as reducing agents and electrodes in metallurgical processes, as corrosion-resistant materials in furnaces and heat exchangers, as carbon electrodes, as fillers and colorants in plastics, rubbers and inks, and as strengtheners in many polymer formulations including tires and hoses. High-purity carbon in many allotropes and morphologies is a bulk commodity chemical widely used in industry. Carbon nanotubes (CNTs) may be particularly valuable.

CNTs may be used for various emerging applications because of their remarkable material properties. CNT use in various manufacturing processes potentially adds strength, toughness, impact resistance, electrical conductivity, and/or thermal conductivity to a product. Currently, CNTs are one of the more expensive allotropes of carbon, and the cost, availability, and quality limit broad industrial uses of this material. Methods for producing CNTs that reduce costs and improve availability and quality would therefore be useful.

CNTs may be produced in a variety of sizes and types. Background information on carbon nanotubes is included in U.S. Patent Application Publication No. 2012/0034150 A1, titled "Method for Producing Solid Carbon by Reducing Carbon Oxides," and published on Feb. 9, 2012, the contents of which are incorporated by this reference. There are two main classes of carbon nanotubes: single-walled carbon nanotubes (SWNTs) and multi-walled carbon nanotubes (MWNTs). CNTs are typically produced using methods that form primarily SWNTs or primarily MWNTs of various lengths and diameters. One CNT manufacturing process, described in U.S. Patent Application Publication No. 2012/0034150, may produce a mixture of both MWNTs and SWNTs.

DISCLOSURE

In some embodiments, an apparatus for producing carbon nanoparticles by reducing carbon oxide compounds using a reducing agent includes a reactor configured to receive a dried recycle gas stream, a fresh feed gas stream comprising carbon oxide, and a gaseous reducing agent. The reactor includes at least one mixing means configured to mix the reagents to form a combined gaseous feed stream, a first heat exchanger configured to heat the combined gaseous feed stream to a first temperature, at least one heater configured to further heat the combined gaseous feed stream to a temperature higher than the first temperature, and a reaction vessel configured to receive the heated combined gaseous feed stream. The reaction vessel is configured to maintain predetermined reaction conditions of temperature and pressure, and has an output configured to deliver a tail gas stream to the first heat exchanger. The reaction vessel and other associated vessels and piping that may be subjected to metal dusting conditions in the course of normal service may be designed to prevent metal dusting such as, for example, by using high-chromium steel or a ceramic lining.

The system also includes a product separator configured to separate the tail gas stream into a products stream and the clean tail gas stream. The products stream includes carbon nanoparticles. The product separator is configured to pass the products stream through a cooling heat exchanger lock drum. The system also includes a water separation unit configured to receive the clean tail gas stream from the product separator. The water separation unit includes a second heat exchanger configured to transfer heat from the clean tail gas stream to the recycle gas stream, a first condenser configured to receive the clean tail gas stream and to cool the clean tail gas stream to condense water from the clean tail gas stream, and a second condenser to further cool the clean tail gas stream and form the dried recycle stream. A product receiving unit (e.g., a product packaging unit) is configured to receive the products stream from the cooling heat exchanger lock drum.

In some embodiments, product separator and water separator systems may be combined as a scrubber suitable for condensing at least a portion of the water vapor in the tail gas stream and for removing the solid carbon entrained in the tail gas stream. In such cases, the solid carbon becomes entrained in the water stream exiting the scrubber. The wet product may be subsequently removed from the water and dried to form a dry product that can then be transferred to a product-receiving unit, as described above.

BRIEF DESCRIPTION OF THE DRAWINGS

FIG. 16 is a simplified schematic diagram of a water treatment subsystem for the system of FIG. 11;

FIG. 17 is a simplified schematic diagram of a venting subsystem for the system of FIG. 11;

FIG. 18 is a simplified schematic diagram of another system for producing solid carbon;

MODE(S) FOR CARRYING OUT THE INVENTION

Figure 1A:
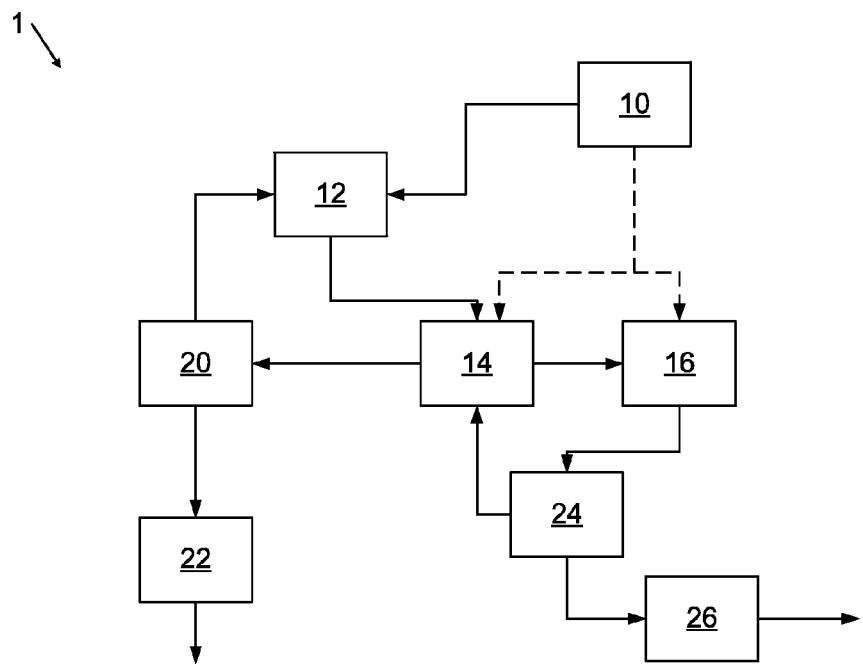
FIGS. 1a and 1b are simplified schematic diagrams of a system for producing solid carbon and water using carbon oxides and a reducing agent, and showing two alternative flow paths.

The present disclosure describes a reactor, system, and method for the production of solid carbon products from reactive gases using a fixed plate reactor, a fluidized-bed reactor, or another type of reactor, along with separation equipment for solid carbon and water. The products are formed from the reactive gases in contact with a catalyst material. The reactor, system, and method reduce the capital and operating costs associated with production of solid carbon and water. By adjusting operating parameters of the system, a variety of carbon allotropes of various morphologies can be produced using the system. For example, the systems may be used to form carbon nanotubes (CNTs), buckminsterfullerenes, graphite, carbon nanofibers, graphene, diamond, and amorphous carbon including coke and carbon black. In particular, the methods and systems disclosed herein generally use carbon oxides and a reducing agent to form products and water in a wide variety of reactor designs including, but not limited to, fixed-plate reactors, aerosol reactors, shaft kiln reactors, fixed bed reactors, counter-flow bed reactors, or fluidized-bed reactors. The system may be scaled to various production capacities.

As used herein, the terms "product," "products," "solid products," "carbon products," and "solid carbon products" are synonymous and mean and include any dusty, friable, powdery, sandy, chunky, or porous material that may occur as solid granules or agglomerations of solid material, with or without voids. Such materials specifically include nanoparticles of various chemistries and morphologies including carbon nanotubes, carbon nanofibers, and nanodiamonds.

As used herein, the term "carbon oxide" means and includes carbon dioxide, carbon monoxide, and mixtures thereof. As used herein, the term "reducing agent" means and includes a material capable of reducing a carbon oxide. Reducing agents include, for example, hydrogen, a hydrocarbon gas such as methane, an alcohol such as ethyl alcohol, and mixtures thereof.

As used herein, the terms "catalyst" and "catalyst material" mean and include a material formulated to promote one or more reactions, resulting in the formation of a product. A portion of a catalyst may be removed from a surrounding portion of the catalyst during the reaction and contained in or adhered to the product. Thus, some of the catalyst may be physically removed during the reaction, and the catalyst may be continually replenished. The portion of the catalyst may not therefore be considered a catalyst in the classical sense, but is nonetheless referred to herein and in the art as a "catalyst" if the reaction is not believed to alter chemical bonds of the material forming the catalyst. Particularly useful catalysts for forming products include, for example, iron, nickel, cobalt, etc., or other elements of Groups 2 through 15 of the periodic table, and alloys and mixtures thereof. For example, catalysts may be selected from Groups 5 through 10 of the periodic table. Note that the periodic table may have various group numbering systems. As used herein, group 2 is the group including Be, group 3 is the group including Sc, group 4 is the group including Ti, group 5 is the group including V, group 6 is the group including Cr, group 7 is the group including Mn, group 8 is the group including Fe, group 9 is the group including Co, group 10 is the group including Ni, group 11 is the group including Cu, group 12 is the group including Zn, group 13 is the group including B, group 14 is the group including C, and group 15 is the group including N. In some embodiments, commercially available metals are used without special preparation. Catalysts may be granular, fibrous, particulate, zeolite, or in any other form compatible with the reactor design and catalyst-handling methods disclosed herein. For example, catalyst includes steel sand-blasting grit, steel wool, chopped steel wool, and similar materials.

304 stainless steel appears to catalyze the formation of CNTs under a wide range of temperatures, pressures, and gas compositions. However, the rate of formation of CNTs on 304 stainless steel appears to be relatively low, such that 304 stainless steel may be used effectively as a construction material for process equipment, with minimal deposition on surfaces thereof in normal operations. 316L stainless steel, in contrast, appears to catalyze the formation of solid carbon at significantly higher rates than 304 stainless steel, but may also form various morphologies of carbon. Thus, 316L stainless steel may be used as a catalyst to achieve high reaction rates, but particular reaction conditions may be maintained to control product morphology. Catalysts may be selected to include Cr, such as in amounts of about 22% or less by weight. For example, 316L stainless steel contains from about 16% to about 18.5% Cr by weight. Catalysts may also be selected to include Ni, such as in amounts of about 8% or more by weight. For example, 316L stainless steel contains from about 10% to about 14% Ni by weight. Catalysts of these types of steel have iron in an austenitic phase, in contrast to alpha-phase iron used as a catalyst in conventional processes. Given the good results observed with 316L stainless steel, the Ni and/or Cr may have a synergistic effect with Fe.

Solid carbon is formed using a catalytic conversion reactor to reduce carbon oxides using a reducing agent in the presence of a catalyst. By adjusting operating parameters of the system (e.g., reaction gas mixture, type and form of the catalyst, temperature, or pressure), various carbon allotropes and morphologies can be produced.

Oxidation and subsequent reduction of the catalyst surface alter the grain structure and grain boundaries. Without being bound by any particular theory, oxidation appears to alter the surface of the metal catalyst in the oxidized areas. Subsequent reduction may result in further alteration of the catalyst surface. Thus, the grain size and grain boundary of the catalyst may be controlled by oxidizing and reducing the catalyst surface and by controlling the exposure time of the catalyst surface to the reducing gas and the oxidizing gas. The oxidation and/or reduction temperatures may be in the range from about 500° C. to about 1,200° C., from about 600° C. to about 1,000° C., or from about 700° C. to about 900° C. The resulting grain size may range from about 0.1 μm to about 500 μm, from about 0.2 μm to about 100 μm, from about 0.5 μm to about 10 μm, or from about 1.0 μm to about 2.0 μm. In some embodiments, the catalyst may be an oxidized metal (e.g., rusted steel) that is reduced before or during a reaction forming solid carbon. Without being bound to any particular theory, it is believed that removal of oxides leaves voids or irregularities in the surface of the catalyst material, and increases the overall surface area of the catalyst material.

Catalysts may be in the form of nanoparticles or in the form of domains or grains and grain boundaries within a solid material. Catalysts may be selected to have a grain size related to a characteristic dimension of a desired diameter of the product (e.g., a CNT diameter). Catalyst powder may be formed in or near the reaction zone by injecting an aerosol solution such that upon evaporation or a carrier solvent, a selected particle size distribution results. Alternatively, powdered catalyst may be entrained in a carrier gas and delivered to the reactor. By selecting the catalyst and the reaction conditions, the process may be tuned to produce selected morphologies of product. In some embodiments, the catalyst may be formed over a substrate or support, such as an inert oxide that does not participate in the reactions. However, the substrate is not necessary; in other embodiments, the catalyst material is an unsupported material, such as a bulk metal or particles of metal not connected to another material (e.g., loose particles, shavings, or shot, such as may be used in a fluidized-bed reactor).

In certain embodiments, a broad range of inexpensive and readily available catalysts, including steel-based catalysts, are described, without the need for activation of the catalyst before it is used in a reaction. Iron alloys, including steel, may contain various allotropes of iron, including alpha-iron (austenite), gamma-iron, and delta-iron. In some embodiments, reactions disclosed herein advantageously utilize an iron-based catalyst, wherein the iron is not in an alpha phase. In certain embodiments, a stainless steel containing iron primarily in the austenitic phase is used as a catalyst.

Catalysts, including an iron-based catalyst (e.g., steel, steel wool), may be used without a need for an additional solid support. In certain embodiments, reactions disclosed herein proceed without the need for a ceramic or metallic support for the catalyst. Omitting a solid support may simplify the setup of the reactor and reduce costs.

A reactor may be coupled with heating and cooling mechanisms to control the temperature of the reactor. For example, a reactor may be configured such that products and excess reactant are recycled through a cooling mechanism to condense water vapor. The products and/or excess reactant may then be reheated and recycled through the reactor. By removing some of the water vapor in the recycled gases, the morphology of formed may be controlled. Changing the partial pressure of water vapor changes the carbon activity of a mixture. The reactor may also be coupled to a carbon collector in which water and unreacted reactants are separated from the carbon products. The separated products are collected and removed from the system.

In certain embodiments hereof, the partial pressure of water in the reaction is regulated by various means, including recycling and condensation of water, to influence, for example, the structure or other aspects of the composition of products produced. The partial pressure of water appears to assist in obtaining certain desirable carbon allotropes.

The system typically includes various subsystems, such as a gas supply subsystem, a gas handling subsystem, a heating subsystem, a reactor subsystem, a product separation subsystem, a water separation subsystem, a water treatment subsystem, a product packaging subsystem, and a utilities subsystem. The subsystems may be arranged in many combinations, and may be replaced with other unit operations that perform similar or related functions. Various arrangements of these subsystems are described herein. The characterization of components of the system as distinct subsystems is for convenience of explanation only, and various other groupings of the unit operations described may be selected based on the principles disclosed herein.

The subsystems may be arranged to accommodate a variety of gas and product flows. In general, gas flows from the gas handling subsystem to the reactor subsystem. Recycled gas flows from the water removal subsystem to the gas handling subsystem, and water flows from the water removal subsystem to the water treatment subsystem. Other flows may be directed to accommodate selected design specifications. Product may be removed by a product removal subsystem either directly from the reactor (e.g., as in a shaft-kiln or counter-flow packed bed reactor) or from the tail gas stream exiting the reactor (e.g., as in a fluidized bed or pulsed bed reactor) prior to entering the water removal subsystem.

For example, FIG. 1a illustrates a simplified block flow diagram of a system 1 for producing solid carbon and water. FIG. 1a includes process flow lines indicating the movement of material through the system 1. In the system 1, reaction gases flow from a gas supply subsystem 10 to a gas handling subsystem 12, then to a heating subsystem 14 on the way to a reactor subsystem 16.

As further depicted by dashed lines in FIG. 1a, the gas supply subsystem 10 may optionally provide reaction gases at various points within the system 1. For example, the gas supply subsystem 10 may supply gases directly to the heating subsystem 14, where the reaction gases may mix with recycled gases from the gas handling subsystem 12. Alternatively, the gas supply subsystem 10 may provide the reaction gases directly into the reactor subsystem 16.

Products may be removed before cooling. In such embodiments, hot reaction gases with entrained products flow directly from the reactor subsystem 16 to the product removal subsystem 24. After the products are removed, remaining hot gases pass to the heating subsystem 14. The remaining hot gases are counter-flowed through one or more heat exchangers in the heating subsystem 14 to provide at least a portion of the heat required to bring the reaction gases to a predetermined reaction temperature. The resulting cooled gases flow to the water removal subsystem 20. The water removal subsystem 20 separates water from the gases. The water passes to a water treatment subsystem 22, and the remaining gases are recycled to the gas handling subsystem 12. A utilities subsystem provides support to other subsystems, such as for cooling water, chilled glycol, an inert gas purge, a vent stack, and/or a flare.

Figure 1B:
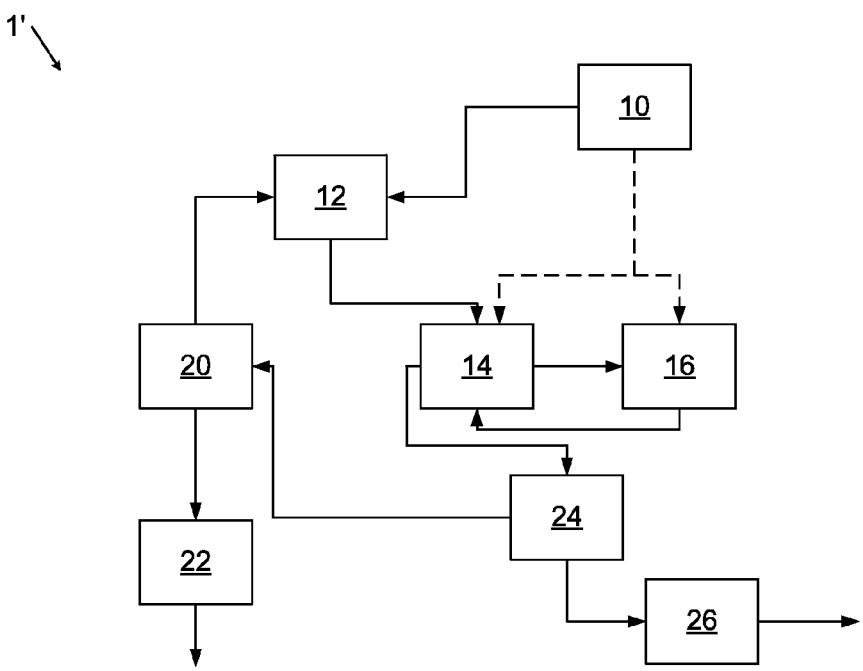

An alternate system 1' illustrating another way in which the subsystems may be combined, is depicted in FIG. 1b. The system 1' has the same subsystems as system 1, but the tail gases and products have different flow paths. Hot tail gases with entrained products flow from the reactor subsystem 16 directly to the heating subsystem 14, where at least a portion of the heat in the hot tail gases is transferred to the reaction gases entering the reactor subsystem 16. After the heat exchange, the cooled tail gases flow to the product removal subsystem 24, where the product is removed. The remaining tail gases then flow to the water removal subsystem 20.

The choice of flow paths for gases, liquids, and solids is a design choice. If pressurizing the reaction gases is required, the reaction gases may flow from the gas supply subsystem 10 to the gas handling subsystem 12, and from there to the heating subsystem 14. If compression is not desired (e.g., if the gas supply subsystem 10 provides reaction gases at sufficient pressure), the reaction gases may flow to the heating subsystem 14 or directly to the reactor subsystem 16.

In some embodiments, the gas supply subsystem 10 provides a fresh feed gas stream of process gases, including at least one carbon oxide and at least one reducing agent. A portion of the carbon oxide fresh feed gas stream and a portion of the reducing agent fresh feed gas stream are added to the recirculating gas mixture separately or in combination.

Typically, adding the gases separately to the recirculating gas mixture just prior to the reactor subsystem 16 greatly reduces the risk of reaction during heating. However the fresh feed gas streams can be added at any point to the recirculating gas stream, including prior to the gas handling subsystem 12. Depending on where the fresh feed streams are added, the fresh feed gas streams may be preheated to avoid lowering the temperature of the recirculating gas mixture below the capacity of the system 1 to maintain selected conditions. In one embodiment, hydrogen is added before the gas handling subsystem 12 without preheating and carbon oxide is preheated and added just before the reactor subsystem 16. In another embodiment, the hydrogen and the carbon oxide are each preheated and added separately just before the reactor subsystem 16.

The gas supply subsystem 10 may include means for storing a supply of reaction gases and means for regulating the pressures, temperatures, and flow rates of the gases. The gas supply subsystem 10 may also contain a control system feedback loop to monitor and control the flow rate of at least one of the fresh feed gases to maintain system pressure or reaction gas composition in the system 1. An effective control system may use the system pressure (e.g., the inlet or outlet pressure of the compressor or process gas blower) to control the flow rate of fresh reducing agent and the reaction gas composition to control the carbon oxide flow rate. Parameters that may be controlled include the carbon activity and the oxygen potential of the reaction gas mixture in the reactor. The partial pressure of water is one factor that appears to affect the type and character (e.g., morphology) of solid carbon formed, as well as the kinetics of carbon formation.

Carbon activity ($A_c$) can be used as an indicator of whether solid carbon will form under particular reaction conditions (e.g., temperature, pressure, reactants, concentrations). Without being bound to any particular theory, it is believed that carbon activity is the key metric for determining which allotrope of solid carbon is formed. Higher carbon activity tends to result in the formation of CNTs, lower carbon activity tends to result in the formation of graphitic forms.

Carbon activity for a reaction forming solid carbon from gaseous reactants can be defined as the reaction equilibrium constant times the partial pressure of the reactants, divided by the partial pressure of gaseous tail gas constituents. For example, in the reaction, $CO_{(g)}+H_{2(g)} \leftrightarrows C_{(g)}+H_2O_{(g)}$, with a reaction equilibrium constant of K, the carbon activity $A_c$ is defined as $K \cdot (P_{CO} \cdot P_{H2}/P_{H2O})$. Thus, $A_c$ is directly proportional to the partial pressures of CO and $H_2$, and inversely proportional to the partial pressure of $H_2O$. Higher $P_{H2O}$ tends to inhibit CNT formation. The carbon activity of this reaction may also be expressed in terms of mole fractions and total pressure: $A_c = K \cdot P_T (Y_{CO} \cdot Y_{H2}/Y_{H2O})$, where $P_T$ is the total pressure and Y is the mole fraction of a species. Carbon activity generally varies with temperature because reaction equilibrium constants vary generally with temperature. Carbon activity also varies with total pressure for reactions in which a different number of moles of gas are produced than are consumed. Mixtures of solid carbon allotropes and morphologies thereof can be achieved by varying the catalyst and the carbon activity of the reaction gases in the reactor.

Similarly, oxygen potential can be used as an indicator of whether a catalyst material will oxidize under particular reaction conditions (e.g., temperature, pressure, reactants, and reactant concentrations). Oxidation of catalyst material may limit the ability of the catalyst material to subsequently catalyze reactions. Oxygen potential may be defined in terms of the equilibrium constant of the oxidation reaction. For example, iron metal may be oxidized to iron oxide: $Fe+\tfrac{1}{2}O_2 \leftrightarrows FeO$. The equilibrium constant is defined as $K_{FeO}=\exp[-\Delta G_{FeO}/(R_g T)]=\sqrt{(P_{O2}/P_T)}$, where $\Delta G_{FeO}$ is the Gibbs free energy of the oxidation reaction, $R_g$ is the gas constant, T is the absolute temperature, $P_{O2}$ is the partial pressure of oxygen, and $P_T$ is the total pressure. Using this equation, the partial pressure of oxygen that will initiate the oxidation of iron may be determined: $P_{O2} > P_T K_{FeO}^2$. The partial pressure of oxygen can be obtained from the equilibrium of one or more fast reactions involving oxygen, such as:

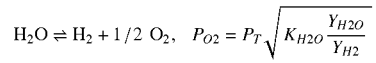

or

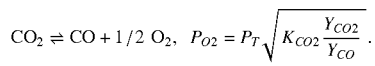

In these reactions, $K_i$ is the equilibrium constant for the decomposition of gas i. The partial pressure of oxygen may be controlled by the partial pressures of other gases.

The gas handling subsystem 12 typically includes an air-handling device (e.g., a compressor or process gas blower) suitable for moving reaction gases through the system by providing motive power to flow the reaction gases at desired flow rates and pressures through the system 1. The gas handling subsystem 12 also includes associated controls and components. The gas handling subsystem 12 circulates the gas mixtures through the system 1. Various compressor types suitable to the service and capacity of the system 1 may be selected including reciprocating, scroll, screw, hooked-screw and centrifugal compressors, or process gas blowers. In one embodiment, discharge from the water removal subsystem 20 feeds a compressor of the gas handling subsystem 12. The gas handling subsystem 12 typically discharges the reaction gas stream to the heating subsystem 14. The gas handling subsystem 12 may also include a control system feedback loop to monitor and control the flow rate of the reaction gas stream.

The heating subsystem 14 typically includes one or more heat exchangers, wherein hot gases from the outlet of the reactor subsystem 16 are counter flowed with reaction gases flowing to the inlet of the reactor subsystem 16. One or more heaters may provide additional heat to the reaction gases to reach a selected temperature prior to entering the reactor subsystem 16. The reaction gas stream may be heated to reaction temperatures in the heating subsystem 14. The flow of gases through the heating subsystem 14 may allow recovery of at least a portion of the process heat from the reaction tail gas stream. The reactor subsystem 16 may also contain one or more heaters to further heat the reaction gas feed stream to a selected temperature prior to entering a reaction vessel. The heating subsystem 14 may also include a control system feedback loop to monitor and control the temperature of the reaction gas stream.

The reactor subsystem 16 includes a reactor, such as a fluidized bed, a packed bed, a shaft kiln, or any other appropriate design. The reactor subsystem 16 also typically includes associated controls and components, such as features for catalyst flow. A reaction vessel receives the heated combined feed stream and catalyst. CNT and water formation occur within the reaction vessel as the reaction gas stream contacts the catalyst. The reaction vessel outputs a reactor tail gas stream that may contain the reaction products (e.g., water and CNTs or other carbon products) and unreacted gases. The reaction vessel may also include a control system feedback loop to monitor and control reaction conditions in the reaction vessel and/or the heaters.

Various reactor types and configurations may be used in the reactor subsystem 16, including, plate, fixed-bed, fluidized-bed, pulsed fluid-bed, shaft-kiln, and rotating-bed reactors. In one embodiment, catalyst material is formed into a series of plates in a plate reactor. For example, the plates may be concentric steel tubes. In another embodiment, the catalyst material is in the form of small particles in a fixed-bed reactor, and the catalyst material and product are periodically removed from the reactor and agitated to remove the product from the catalyst particles. The catalyst material is separated for reuse, and the product is removed for packaging. In yet another embodiment, a pulsed fluid-bed reactor is used, wherein a bed of catalyst particles is maintained as a fixed bed and periodically fluidized by pulses of the reaction gases (e.g., a temporary increase in the flow rate of reaction gases) so that the product is elutriated and removed from the reactor.

The product removal subsystem 24 typically includes means for separating products from a gas stream. Such means may include one or more cyclones (single-stage or multi-stage), filters, electrostatic precipitators, bag houses, or various combinations of these separation devices. The product removal subsystem 24 may include any suitable device(s), such as one or more cyclones operating in series, to remove various fractions of solid carbon from the tail gas stream. The product removal subsystem 24 may also include associated controls and components. The product removal subsystem 24 removes the product from the reactor tail gas stream to form a products stream and a clean tail gas stream. In embodiments in which the reactor subsystem 16 includes a shaft-kiln reactor, the product and catalyst are removed from the bottom of the reactor through a lock hopper system. In such embodiments, the product removal subsystem 24 may include additional means to separate the residual catalyst from the solid carbon and to classify the residual catalyst and recycle all or portions thereof to the catalyst feed system for the reactor.

In some embodiments, a lock drum passes the products stream from the product removal subsystem 24 to a product packaging subsystem 26, while a clean tail gas stream outlet passes the clean tail gas stream to the heating subsystem 14, to a heat exchanger within the reactor subsystem 16, or to the water removal subsystem 20. The function of a lock drum is to isolate the reaction gases in the product removal subsystem 24 from the product packaging subsystem 26. A lock drum typically includes means for purging the reaction gases and may include means for cooling of the product prior to transfer to the product packaging subsystem 26. The product packaging subsystem 26 may include means for handling and transfer of materials, such as pneumatic transfer, screw conveyor, or other such means as are commonly used in the handling of powdered or granular products.

The product removal subsystem 24 may be configured to operate at substantially the same temperature as the reactor, such as in embodiments in which the tail gases flow from the reactor subsystem 16 directly to the product removal subsystem 24 (e.g., in system 1 of FIG. 1a). In such embodiments, materials and design of the lock hopper may be selected to withstand the expected temperatures of the products. In embodiments in which the tail gases are cooled before flowing to the product removal subsystem 24 (e.g., in system 1' of FIG. 1b), materials and design of the lock hopper may be less robust. That is, cooling the tail gases may allow the lock hopper to be formed from a wider range of materials. Whether to cool the reactor tail gas prior to or after product separation may influence the available product-separation options because some separation techniques may require particular temperature ranges.

In some embodiments, the product removal subsystem 24 or the water removal subsystem 20 may include a water-gas conversion reactor capable of capturing solid carbon material that bypasses the product removal subsystem 24. Water is injected into the water-gas conversion reactor so that the water-gas reaction (i.e., $C_{(s)} + H_2O \rightarrow CO + H_2$) converts remaining solid carbon material back to carbon oxides and hydrogen. Oxidation of solid carbon may limit or prevent the fouling of downstream equipment, contamination of the water removed from the tail gas stream, or contamination of the vent gas streams.

In some embodiments, the water-gas conversion reactor may include a control system to regulate the flow of water based on the pressure drop across the water-gas reactor and the downstream water content of the clean tail gas stream. The water-gas conversion reactor may include filter materials selected to withstand the operating temperatures and water-gas reaction conditions (e.g., sintered metal or ceramic filters). In some embodiments, multiple filters may be employed, and reaction gases may alternate between the filters. In such embodiments, each filter may cycle between a filtering mode and a water-gas reaction mode. The filter may collect solid carbon in filtering mode. After a period of time, the filtering efficiency may decrease. The filter may then be switched to water-gas reaction mode. In the water-gas reaction mode, the filter or a supplemental reaction gas stream (e.g., all or a portion of the clean tail gas stream) is heated to increase reaction rates of the water-gas reaction. After a period of time, the filter may be free of built-up solid carbon, and the filter may be switched back to filtering mode. If two or more filters are present, one may operate in filtering mode while another operates in water-gas reaction mode, allowing continuous operation of the filtering system.

The reaction gas mixtures and conditions of the system 1 are commonly associated with metal dusting (i.e., deposition of solid carbon on metal surfaces). Thus, the materials and components selected for the high temperature portions of the system 1 may be selected to avoid metal dusting. An advantage of adding water in the water-gas reactor in excess of that required for the water-gas reaction is that water tends to passivate or protect common grades of stainless steel (e.g., 304, 310, etc.) from metal dusting. Excess water may reduce the risk of metal dusting and may be used downstream or removed. For example, if the product removal subsystem 24 includes a water-gas conversion reactor operating with excess water, the clean tail gas leaving the product removal subsystem 24 may flow to the heating subsystem 14 (see FIG. 1). After flowing through the heating subsystem 14 or a portion thereof, the clean tail gas stream may flow through additional heat exchangers to further cool the clean tail gas stream and through one or more filters to remove additional product. The clean tail gas stream then flows through one or more heat exchangers or condensers within the water removal subsystem 20.

The water removal subsystem 20 typically includes means for condensing the water from the process gas stream after the product has been removed. The water removal subsystem 20 may include one or more condensers cooled by water, chilled brine, glycol, or air, as well as associated tanks, controls, and components. In some embodiments, the water removal subsystem 20 includes a two-stage condenser in which the first stage is water-cooled and the second stage is glycol- or brine-cooled to achieve a clean tail gas stream having a lower the dew point than is possible with water-cooling alone.

The water removal subsystem 20 may be operated to remove sufficient water and maintain a desired water concentration (e.g., partial pressure of water) in the dried gases exiting the water removal subsystem 20. The water concentration influences the oxidation potential of reaction gases in the reactor. Therefore, controlling the water concentration may be important to control the deposition of the selected allotropes and morphologies of solid carbon and to avoid oxidation or fouling of the catalysts. The cooling medium (e.g., water, brine, glycol, air, etc.) for the condensers may be provided by a utilities subsystem.

The water removal subsystem 20 may have an output for condensed water and an output for the recycled gas stream. The recycled gas stream returns to the gas handling subsystem 12 for reuse or ventilation to a safe location. If the feed gases contain significant inert impurities, a purge stream may control the accumulation of the inert gases in the system 1. The condensed water from the water removal subsystem 20 is transferred to the water treatment subsystem 22.

The water treatment subsystem 22 typically includes one or more filters for minimizing product discharge in the water. The water treatment subsystem 22 may also include one or more aeration tanks, overflow tanks, and associated controls and components. The water treatment subsystem 22 may be operable to limit or minimize the release of reaction gases or product with the water. The water treatment subsystem 22 may contain a water tank and at least one filter to remove product impurities before discharging condensed water to a drain. The water treatment subsystem 22 may also include air sparging or other treatment of the water to remove dissolved reaction gases from the condensed water.

The product packaging subsystem 26 typically includes product storage and handling equipment to transfer product to containers in a manner that limits or minimizes worker and environmental contamination from airborne solid carbon particles. For example, the product packaging subsystem 26 may include an automated drum load-out station configured to operate with negative pressure, HEPA and ULPA filtration systems, and associated controls and components. The product packaging subsystem 26 may be physically proximate to the product removal subsystem 24 and may include a silo, a vent, and a conveyor belt to move product to enclosed load-out units. The product packaging subsystem 26 may be configured to load containers such as barrels. The product packaging subsystem 26 may also include a blower and filter to provide negative pressurization to load-out units and to remove impurities from air within the product packaging subsystem 26. The product packaging subsystem 26 may also provide access to a product shipping area.

The utilities subsystem typically includes plant services for the operation of the system 1. Such services may include plant air, cooling water supply, chilled brine or glycol supply, vent system (e.g., a stack and flare system), inert purge gas supply and handling, and associated controls and components. The utilities subsystem may provide a cyclic cooling water supply and return (e.g., a cooling tower) and a cyclic glycol supply and return (e.g., a chiller) for the condensers, and at least one vent or flare to release filtered gases.

The system 1 includes various control mechanisms. For example, the system 1 may include means to determine gas composition, reactor pressure, reactor temperature, and reaction gas flow rates. The system 1 may also include means to control such parameters, such as valves, heaters, etc. Controlling such parameters may allow an operator to select products of a given particular quality and morphology.

Gas composition within the system 1 may be controlled by providing the carbon oxide make-up gas stream at a rate selected to maintain a desired carbon activity in the tail gas streams and by providing the reducing agent make-up gas stream to maintain the pressure in the system 1. Because the reducing agent is consumed in the reaction at a stoichiometric ratio with the carbon oxides, the pressure in the system falls as the reaction gases are consumed. The flow of the reducing gas may be controlled to maintain the pressure, and the carbon oxide stream may be controlled to maintain the carbon activity in the tail gas streams.

In some embodiments, the partial pressure of water vapor is controlled within the system 1. Controlling water vapor partial pressure is useful to form a desired allotrope and morphology of solid carbon. Controlling water vapor partial pressure is also useful to maintain the catalyst in a condition for promoting reactions (e.g., by limiting oxidation of the catalyst). Control of the water vapor partial pressure may be achieved through various means, such as controlling the condensation temperature in the water removal subsystem 20, which determines the partial pressure of water vapor in the dry gas leaving the condensers. Control of the water vapor partial pressure may also be achieved through the control of the carbon oxide make-up gas stream, which determines the rate of water formation in the reactor subsystem 16. The reduction of the carbon oxide by the reducing agent in the reactor subsystem 16 results in the formation of water vapor in the reactor subsystem 16.

The water vapor formed in the reactor subsystem 16 is believed to be an important contributor to the allotropes and morphologies of carbon formed. As the oxygen potential of the reaction gases in the reactor subsystem 16 increases, allotropes and morphologies of solid carbon having higher Gibbs free energies tend to preferentially oxidize in the water-gas reaction. By controlling the oxygen potential of the reaction gases in the reactor subsystem 16, the selectivity of the carbon allotropes and morphologies produced can be improved.

The allotropes and morphologies of carbon formed in the reactor subsystem 16 depend on the carbon activity, oxygen potential, temperature, pressure, and type of catalyst. Suitable conditions for various types of solid carbon can be readily determined by experiment.

Carbon activity may be controlled by heating components of the system 1 to operating conditions in the presence of pure hydrogen (e.g., a heated hydrogen stream). Once the system 1 is at operating temperature and pressure, the carbon oxide make-up gas stream is introduced. The flow of the carbon oxide make-up gas stream is controlled to maintain a selected reaction gas composition or tail gas composition. The reducing agent make-up gas stream may be similarly controlled to maintain the desired system pressure.

Thus, the pressure at any point in the system 1 may be used as the process control variable. For example, the compressor outlet pressure may be used as the process control variable to control the reducing agent make-up gas stream flow rate. In other words, the outlet pressure may be maintained at a constant value by changing other parameters. Many variations may also be used to control make-up gas flow, such as safety interlocks, positive feedback control of the carbon activity and oxygen potential by controlling the flow of the carbon oxide make-up gas stream, condenser temperature control in the water removal subsystem 20, etc.

A relatively stable reaction pressure, which may be provided as described above, may be important because the deposition of products is typically a diffusion-limited process. Without being bound to a particular theory, higher pressure appears to correlate with a higher rate of carbon formation. Furthermore, the morphology of the solid carbon may vary with pressure. To maintain consistent carbon morphology, the carbon activity and oxygen potential may be adjusted to compensate for the increased pressure. The carbon activity and oxygen potential can be adjusted by a combination of changing the reaction gas mixture, changing the temperature of the reactor subsystem 16, and changing the temperature of the condensers in the water removal subsystem 20.

In some embodiments, start-up of the system 1 is performed under an atmosphere in which carbon formation is not possible in any of the equipment. For example, the start-up atmosphere may typically be an inert atmosphere such as nitrogen or argon, or a reducing atmosphere such as hydrogen. Start-up often includes a period during which the reactor is at a temperature of at least approximately 500° C. and in an atmosphere of flowing hydrogen or other reducing gas that reduces any metal oxides prior to introducing the reaction gases. The start-up may continue for a suitable time for catalyst reduction, which depends on the catalyst composition and physical form. The flow of reducing gases during the start-up process transports water vapor formed by the catalyst reduction to the water removal subsystem 20, where the water vapor can be removed from the system 1.

Thus, the process heater of the heating subsystem 14 may be divided into two sections: a first high-power start-up heater used for start-up heating only and a second lower-power operating heater for continuous operation. The start-up heater may be isolated from the system during normal operation or may be located in an otherwise cool section of the heating system where the carbon activity is sufficiently low that carbon will not deposit. The operating heater is typically located adjacent the reactor subsystem 16 so that the heated reaction gases flow directly into the reactor vessel from the operating heater.

The operating heater of the heating subsystem 14 can be simplified if direct combustion is used to bring the gases to reaction temperature. If oxygen is introduced into the recycle gas mixture, some of the gases may oxidize, releasing heat and forming CO, $CO_2$, and water in various proportions depending on the composition of the recycle gas mixture. This direct combustion may provide sufficient energy to heat the reaction gases to the reaction temperature. The oxygen may be supplied from a water electrolysis device that generates both oxygen and hydrogen. Both of the generated gases may be subsequently used as feed gases to the process, with the water used for the direct-combustion heating and the hydrogen added as a reducing gas. Direct-combustion heating is described in International Patent Application No. PCT/US14/25065, filed Mar. 12, 2014, titled "Direct-Combustion Heating," the entire disclosure of which is incorporated herein by this reference.

Reaction gas temperature can be controlled by the heating subsystem 14. If all or a portion of the make-up gas stream is injected at the entrance to the reactor vessel, downstream of the operating heater, a make-up heater may be added to this make-up gas stream. The make-up heater can be controlled based on the mixed gas temperature of the make-up gas stream and the reaction gas stream. The make-up gas heater or heaters may use a portion of the hot tail gases to provide energy for the make-up gas heating.

Reaction gas flow rate control can be achieved through a variety of means. Generally, components of the system 1 may be protected from low-flow conditions by interlocking flow controls. For example, when low-flow conditions occur, the carbon oxide make-up gas stream may be terminated and the process heaters shut off.

Example 1

Figure 2:
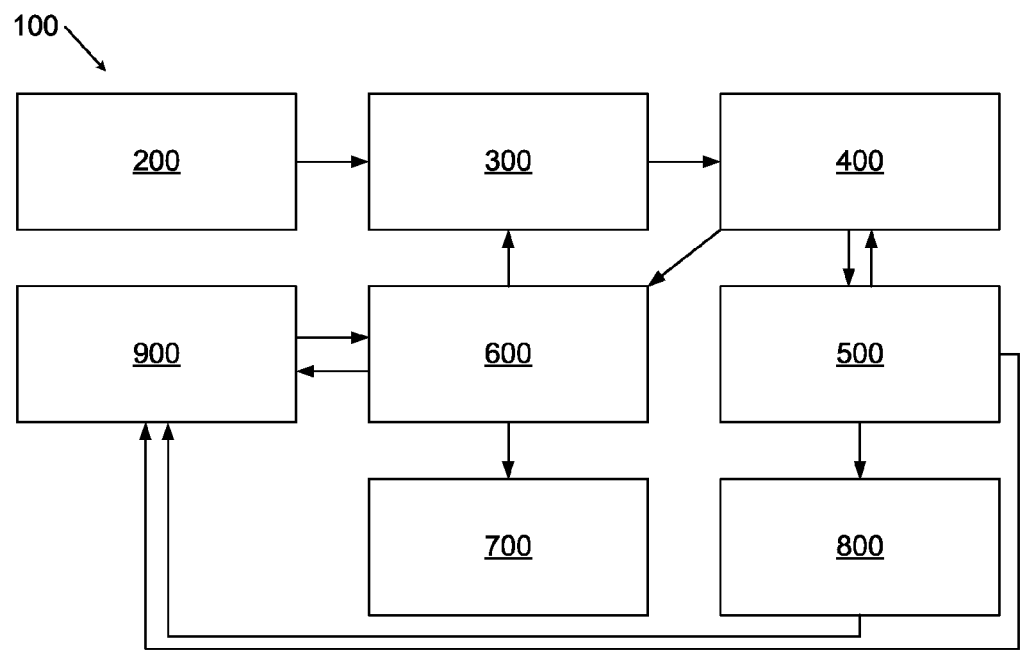
FIG. 2 is a simplified schematic diagram of a system for producing solid carbon of various morphologies, and showing the flow of materials between unit operations.

FIG. 2 depicts one embodiment of a system 100 for production of solid carbon products. Aspects of this embodiment are shown in further detail in FIGS. 3 through 10. The system 100 typically includes a gas supply subsystem 200, a gas handling subsystem 300, a reactor subsystem 400, a product separation subsystem 500, a water separation subsystem 600, a water treatment subsystem 700, a product packaging subsystem 800, and a utilities subsystem 900 (each shown in more detail in FIGS. 3 through 10). In FIGS. 2 through 10, solid arrows indicate the flow of materials (gas, liquid, etc.). In the system 100, information also flows within and between various subsystems. The subsystems may be modified or combined, or may be added to additional subsystems as fitting desired production processes. The subsystems may be positioned to improve operating economics and to make efficient use of space in a process facility. The subsystems may also include various instruments or equipment, such as valves, transducers, flow meters, switches, controllers, computers, etc. The gases referenced in this description are for example only and may be substituted for, and/or added to other gases. The assignment of specific mechanics to specific subsystems within the system is also for example only.

Figure 3:
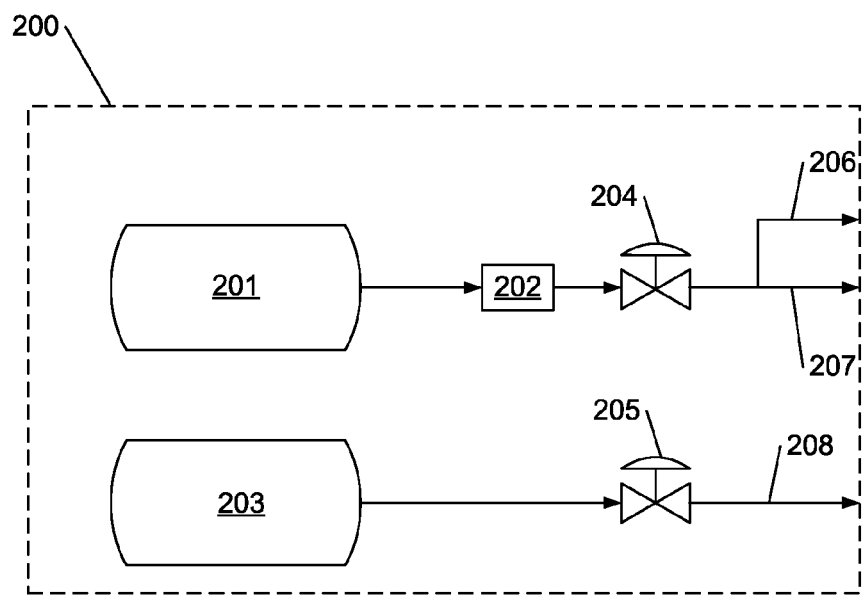
FIG. 3 is a simplified schematic diagram of a gas supply subsystem for the system of FIG. 2.

As depicted in FIG. 3, gas supply subsystem 200 includes at least a supply of liquefied carbon dioxide ($CO_2$) or other carbon oxide 201 (e.g., a tank, pipe, etc.), and a supply of at least one reducing gas 203 such as methane ($CH_4$) of any selected purity. When conditions such as pressure and temperature are appropriate, the carbon oxide 201 passes through a vaporizer 202, which evaporates the carbon oxide 201 to form carbon oxide gas. The carbon oxide gas is split into two portions 206, 207 that pass into the gas handling subsystem 300 (see FIG. 4). One or more valves 204, 205 may control the flow of gases. A reducing agent 203 is provided to subsequent processes through reducing gas stream 208.

Figure 4:
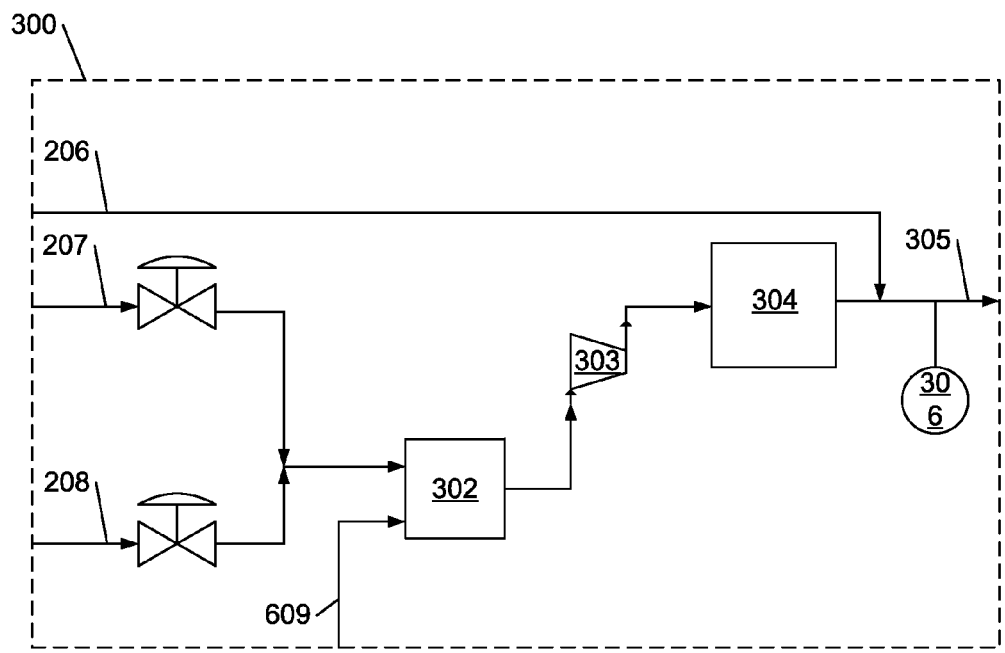
FIG. 4 is a simplified schematic diagram of a gas handling subsystem for the system of FIG. 2.

In the gas handling subsystem 300, shown in FIG. 4, one portion of the carbon oxide gas 207 is mixed with the reducing gas stream 208. The combined gas stream may optionally be mixed with a recycle stream 609 containing dry tail gas supplied by the water separation subsystem 600 (see FIG. 7). The combined gases may enter a first tank 302 before being compressed in a compressor or process gas blower 303. The compressed gas is transferred to a second tank 304 for holding or further processing. The compressed gas from the second tank 304 is mixed with a portion 206 of the carbon oxide gas to form a combined feed gas stream 305 under conditions selected for particular reactions, such as temperature, pressure, concentration, and density. The conditions typically depend on the desired end-product; for example, carbon nanotubes, graphite, and carbon black each form under different reaction conditions. The combined gas feed stream 305 is analyzed by at least one analyzer 306 to obtain information useful for controlling other components of the system 100 (e.g., concentration of reactants in the combined feed gas stream 305, temperature, or pressure).

Figure 5:
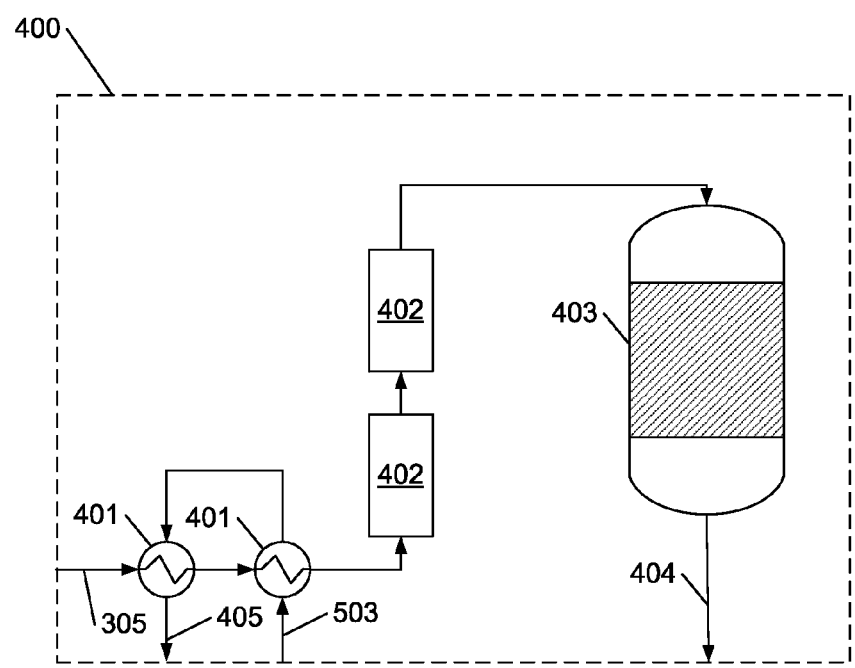
FIG. 5 is a simplified schematic diagram of a reactor subsystem for the system of FIG. 2.

As shown in FIG. 5, the combined gas feed stream 305 flows to the reaction subsystem 400 and to at least one heat exchanger 401 therein. The heat exchanger 401 is typically a counter-flow heat exchanger configured for gas-gas interchange, and the combined gas feed stream 305 receives heat from a warmer clean tail gas stream 503 from a cyclone 501 within the product separation subsystem 500 (see FIG. 6). Multiple heat exchangers may be used to heat the combined gas feed stream; for example, two heat exchangers 401 are shown in FIG. 5. The heat exchangers 401 typically include materials selected for the process temperatures and to be resistant to metal dusting corrosion. In some embodiments, a small amount of water is added to the gas flow streams before the first heat exchanger 401 to cause a deposit of metal oxide on surfaces of the heat exchangers 401 to limit or prevent metal dusting. The heat exchangers 401 cool the clean tail gas stream 503 to form a cooled clean tail gas stream 405, which flows to the water separation subsystem 600 (see FIG. 7).

Within the reaction subsystem 400, the combined gas feed stream 305 flows to at least one heater 402 (e.g., an electric heater) to bring the reactants up to reaction conditions, then to a reactor 403. The heater 402 receives reaction feedback information from the reactor 403 via one or more sensors. The reactor 403 may be lined with a ceramic material to mitigate metal dusting corrosion therein. The reactions that occur within the reactor 403 may be Bosch-type reactions at conditions that produce selected morphologies of solid carbon, such as those disclosed in U.S. Patent Application Publication No. 2012/0034150.

Figure 6:
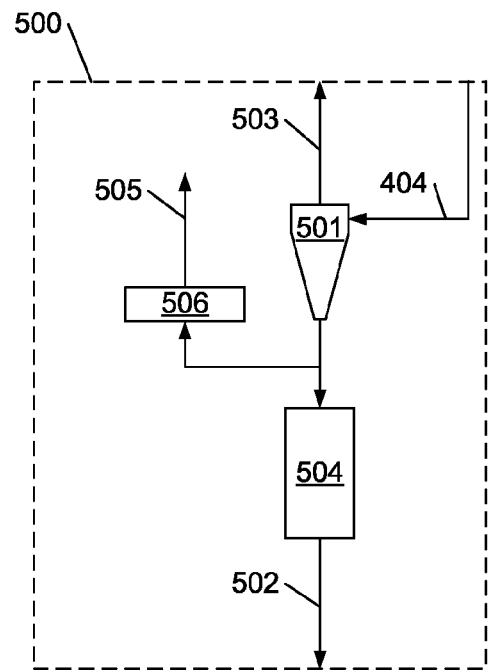
FIG. 6 is a simplified schematic diagram of a product separation subsystem for the system of FIG. 2.

A reactor tail gas stream 404 flows from the reactor 403 to a cyclone 501 within the product separation subsystem 500 (FIG. 6). The cyclone 501 and flow lines connecting the reactor 403 to the cyclone 501 may be ceramic-lined to limit or prevent metal dusting corrosion. The cyclone 501 separates the reactor tail gas stream 404 into a products stream 502, such as CNTs, and the clean tail gas stream 503. The products stream 502 includes particles smaller than a selected size. For example, the cyclone 501 may be configured to separate particles smaller than about 12 microns into the products stream 502. The size of particles separated into the products stream 502 depends on operating conditions and particle properties (e.g., shape and density).

The products stream 502 passes through a cooling apparatus 504. Some residual gases 505, such as gases containing carbon oxides and potentially explosive reducing agents such as hydrogen and methane may pass through a filter 506 and vent to a safe location (e.g., a flare, an exhaust stack). After cooling, the products stream 502 is transferred to the product packaging subsystem 800 (see FIG. 9).

After leaving the cyclone 501, the clean tail gas stream 503 returns to the reaction subsystem 400 (FIG. 5) wherein the at least one heat exchanger 401 transfers heat from the clean tail gas stream 503 to the combined feed gas stream 305, as described above. Alternatively, the reactor tail gas stream 404 may be first passed through a heat exchanger 401 before the cyclone 501. Metal dusting corrosion of the heat exchanger 401 may be reduced by injecting a small amount of water into the clean tail gas stream 503 before the heat exchanger 401. The water causes a layer of metal oxide to form on internal surfaces of the heat exchanger 401, protecting the heat exchanger 401 from metal dusting.

Figure 7:
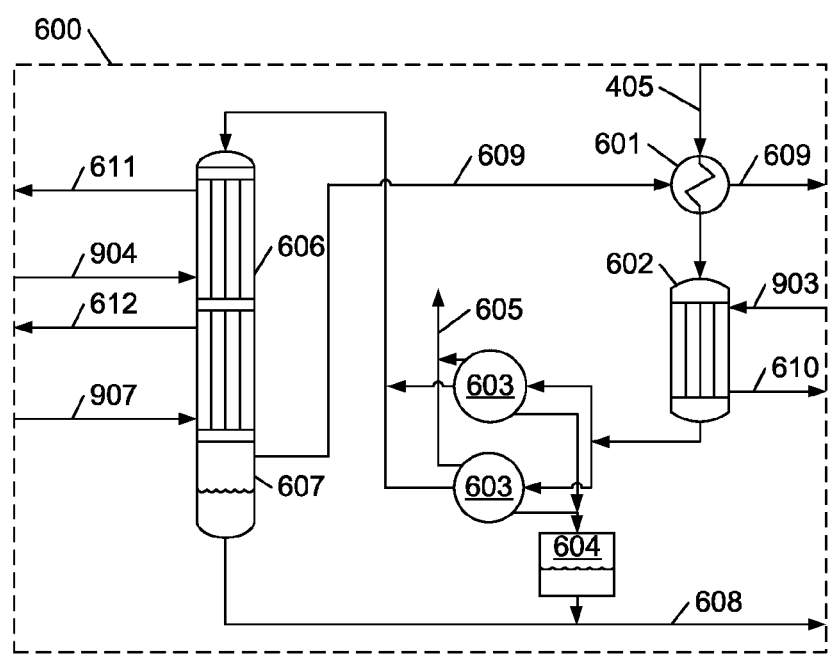
FIG. 7 is a simplified schematic diagram of a water separation subsystem for the system of FIG. 2.
Figure 8:
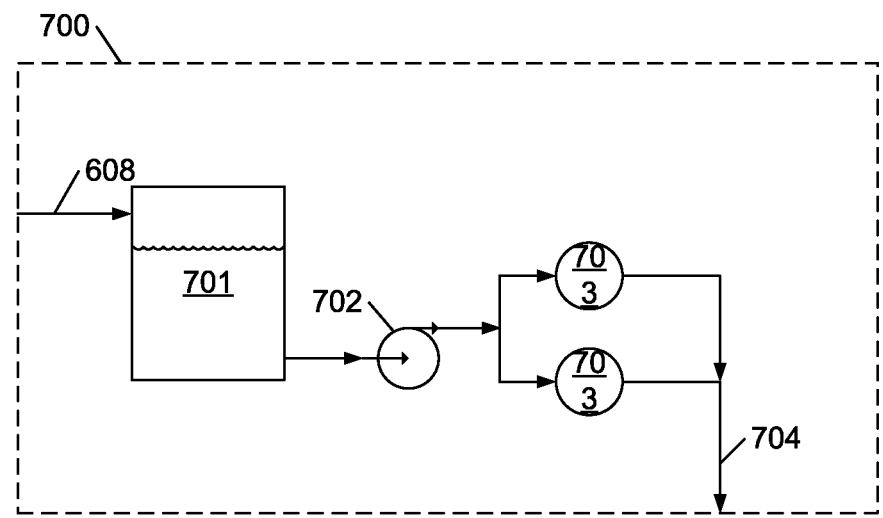
FIG. 8 is a simplified schematic diagram of a water treatment subsystem for the system of FIG. 2.

As shown in FIG. 7, the cooled clean tail gas stream 405 flows to another heat exchanger 601 before entering a condenser 602 (e.g., a one-stage water-cooled condenser) in the water separation subsystem 600. The cooled clean tail gas stream 405 passes through at least one filter 603, where liquid water may be diverted into a holding tank 604. After the clean tail gas stream 405 passes through the filter 603, a portion 605 of the clean tail gas stream 405 may be safely vented, and the remainder of the clean tail gas stream 405 flows into a second condenser 606.

The second condenser 606 may be a two-stage condenser, in which a first stage is water-cooled and a second stage is glycol-cooled. After passing through the two-stage condenser 606, condensed water may be held in a holding tank 607 for a period of time before mixing with the output of the holding tank 604. The condensed water 608 flows to the water treatment subsystem 700 (see FIG. 8) for further processing. As water is collected in the holding tank 607, recycled gases 609 flow back to the heat exchanger 601, and finally to the tank 302 within the gas handling subsystem 300 (FIG. 4). Cooling water and glycol for the condensers 602, 606 may be supplied by the utilities subsystem 900 (see FIG. 10). In such embodiments, cooling water 903, 904 may flow to the first condenser 602 and a first set of coils of the second condenser 606, respectively. The cooling water returns 610, 611 flow back to the utilities subsystem 900. Chilled glycol 907 flows to a second set of coils of the second condenser 606, and glycol return 612 flows back to the utilities subsystem 900.

Within the water treatment subsystem 700 (FIG. 8), a tank 701 accumulates the condensed water 608 from the water separation subsystem 600. The tank 701 may systematically release water to a pump 702, such as through a valved port in or near the bottom of the tank 701. The pump 702 directs the condensed water 608 through one or more filters 703 to form a purified water stream 704. The purified water stream 704 then passes to storage, municipal waste, or another safe and permitted disposal means.

Figure 9:
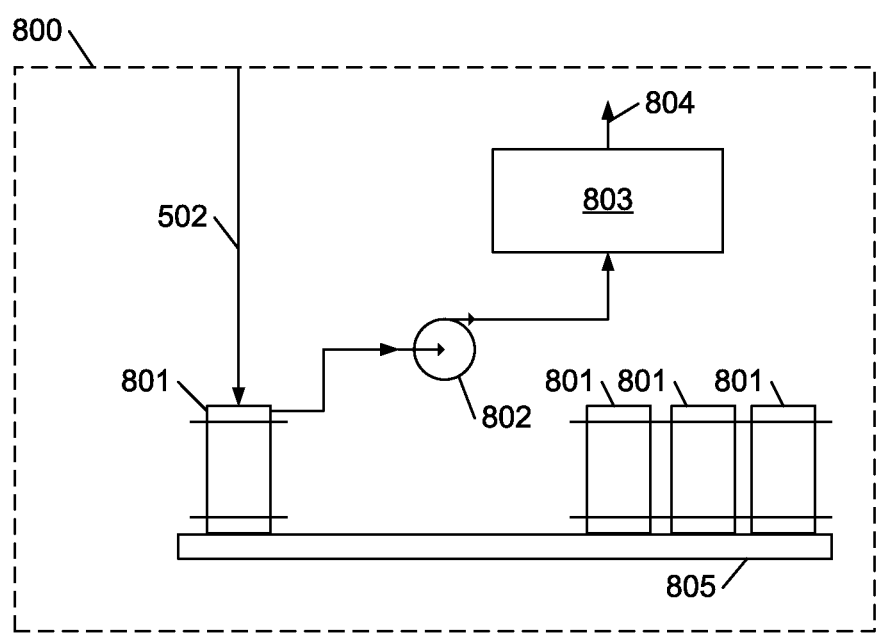
FIG. 9 is a simplified schematic diagram of a product packaging subsystem for the system of FIG. 2.

The product packaging subsystem 800, shown in FIG. 9, transfers the products stream 502 to a shipping package 801, such as a barrel, box, or other container. The shipping package 801 may be selected to meet requirements for safe and effective transportation and delivery. The process of packaging may occur in a negative-pressure enclosure so that products do not contaminate workers or the workspace, for example, by flowing residual gases 804 through a fan or blower 802 and a HEPA/ULPA filter 803 before venting. After the products are packaged, shipping packages 801 may be moved to a shipping area 805, such as a loading dock.

Figure 10:
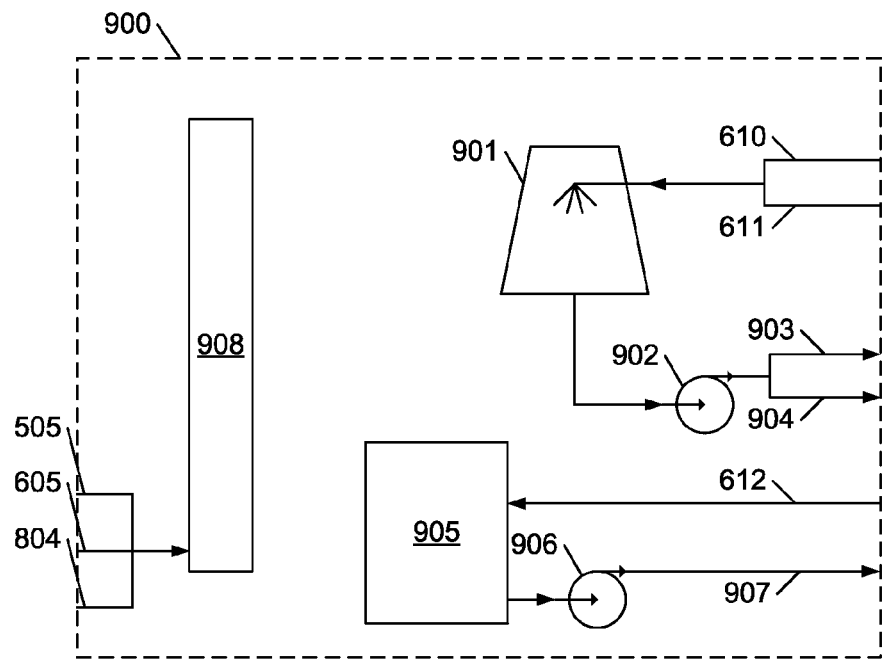
FIG. 10 is a simplified schematic diagram of a utilities subsystem for the system of FIG. 2.

The utilities subsystem 900, shown in FIG. 10, may interact with and support other subsystems of the system 100. For example, the utilities subsystem 900 may include a cooling tower 901 configured to supply cooling water to and receive cooling water returns from the water separation subsystem 600 (FIG. 7). Heat is removed from the cooling water returns 610, 611 in the cooling tower 901. The cooling water 903, 904 is recycled via a pump 902 back to the water separation subsystem 600. A chiller 905 receives the glycol return 612 from the water separation subsystem 600. A glycol pump 906 recycles the chilled glycol 907 to the water separation subsystem 600. The utilities subsystem 900 may also include at least one flare or vent 908 designed for the safe venting of various process gases. For example, the vent 908 may be configured to receive the residual gases 505 from the product separation subsystem 500, the portion of the tail gas stream 605 from the water separation subsystem 600, and/or the residual gases 804 from the product packaging subsystem 800. The utilities subsystem 900 may also include other operations, sensors, or controls, as necessary for the system 100 to function.

Example 2

Figure 11:
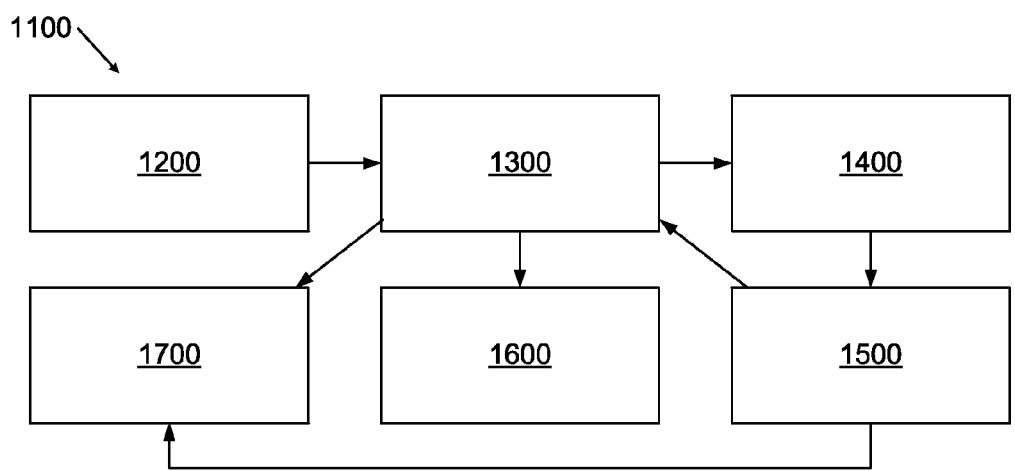
FIG. 11 is a simplified schematic diagram of another system for producing carbon of various morphologies using, for example, hydrogen and carbon oxide.

FIG. 11 depicts another system 1100 for producing solid carbon products of various morphologies. The system 1100 includes a gas supply subsystem 1200, a gas handling subsystem 1300, a fluidized-bed reaction subsystem 1400, a product separation and packaging subsystem 1500, a water treatment subsystem 1600, and a venting subsystem 1700 (each shown in more detail in FIGS. 12 through 17). In the system 1100, solid arrows indicated the flow of materials (gas, liquid, etc.). In FIGS. 11 through 17, solid arrows indicate the flow of materials (gas, liquid, etc.). Information also flows within and between various subsystems. The subsystems may be modified or combined, or may be added to with additional subsystems as fitting desired production processes. The subsystems may be positioned to improve operating economics and to make efficient use of space in a process facility. The subsystems may also include various instruments or equipment, such as valves, transducers, flow meters, switches, controllers, computers, etc. The gases referenced in this description are for example only and may be substituted for, and/or added to other gases. The assignment of specific mechanics to specific subsystems within the system is also for example only.

Figure 12:
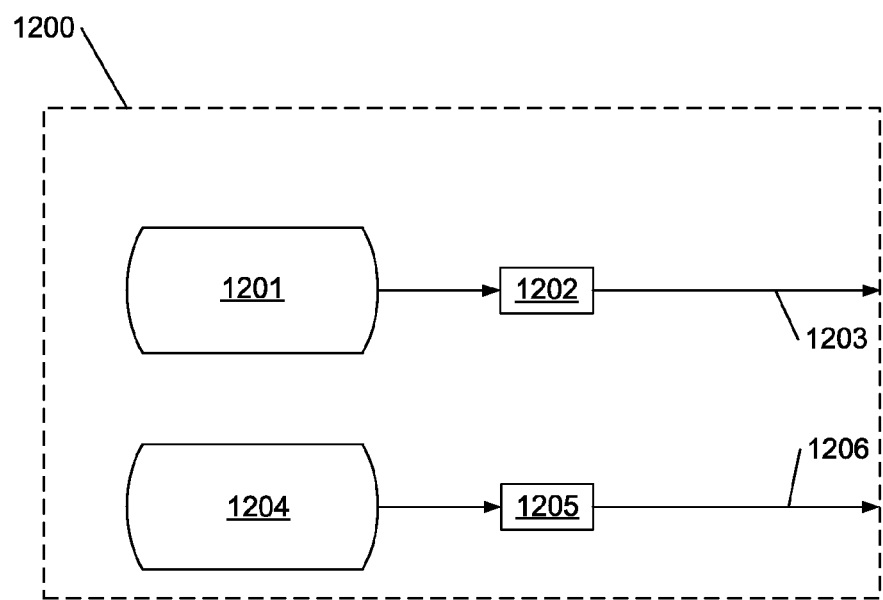
FIG. 12 is a simplified schematic diagram of a gas supply subsystem for the system of FIG. 11.

As depicted in FIG. 12, a supply of liquefied carbon oxide (e.g., CO, $CO_2$) is provided from a source 1101 (e.g., a tank, pipe, etc.) within the gas supply subsystem 1200. When conditions such as pressure and temperature are appropriate, the carbon oxide passes through a first vaporizer 1202, which evaporates the carbon oxide to form carbon oxide gas 1203. The gas supply subsystem 1200 also includes a reducing agent source 1204 of, for example, liquefied hydrogen ($H_2$). When conditions such as pressure and temperature are appropriate, the liquid reducing agent passes through a second vaporizer 1205, which evaporates the liquid reducing agent to form reducing gas 1206.

Figure 13:
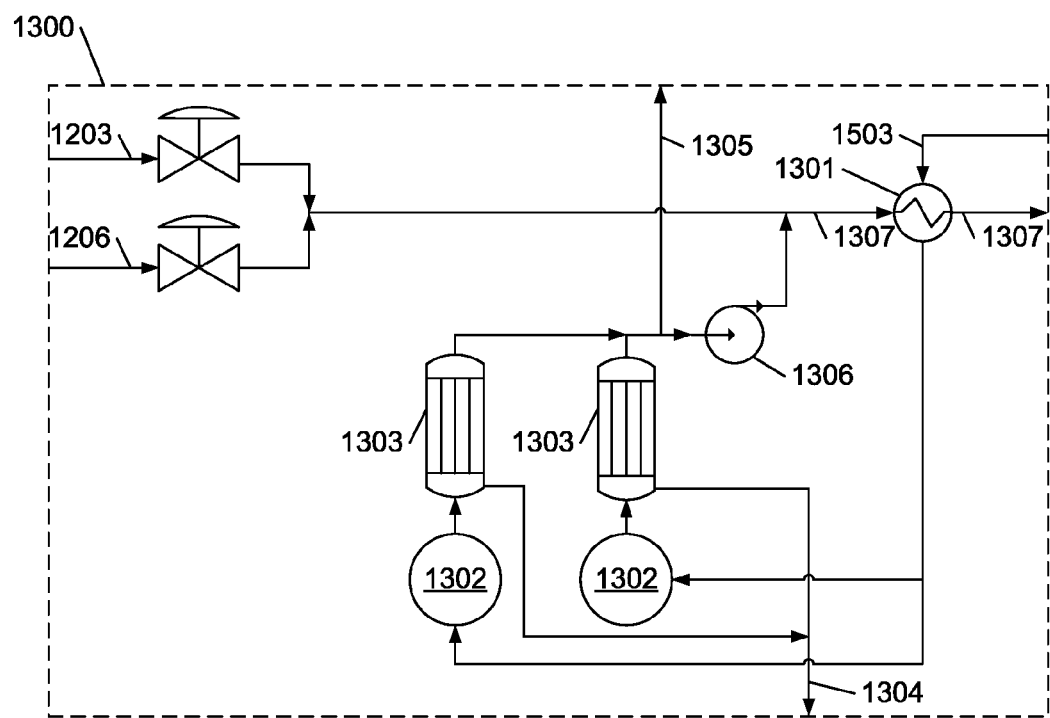
FIG. 13 is a simplified schematic diagram of a gas handling subsystem for the system of FIG. 11.
Figure 14:
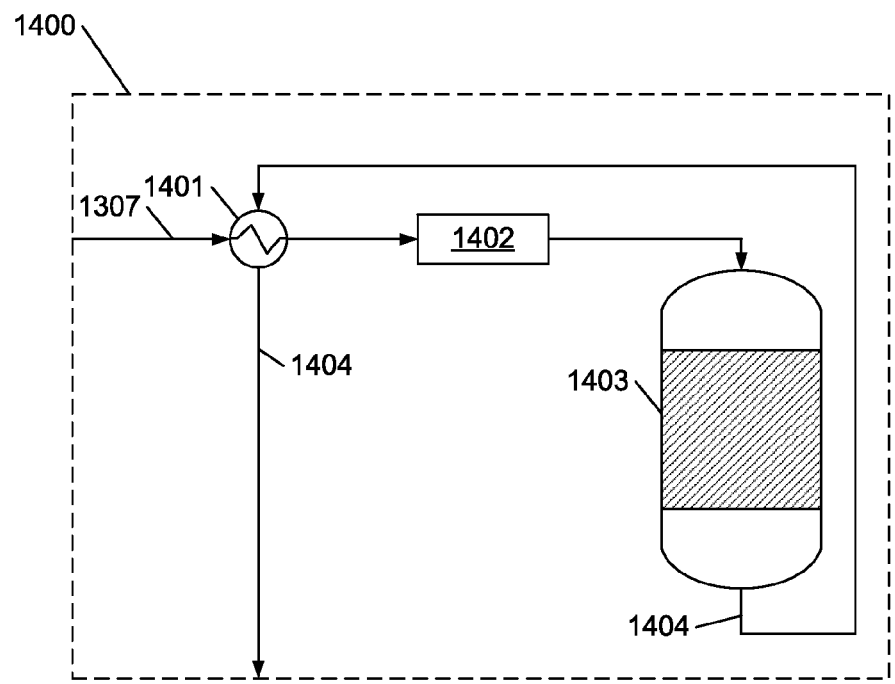
FIG. 14 is a simplified schematic diagram of a fluidized-bed reaction subsystem for the system of FIG. 11.

Both the carbon oxide gas 1203 and the reducing gas 1206 flow to the gas handling subsystem 1300, shown in FIG. 13, where they mix to form a combined fresh feed gas stream. The gas handling subsystem 1300 includes a heat exchanger 1301 configured to receive and cool a clean tail gas stream 1503 from the product separation and packaging subsystem 1500 (see FIG. 15). The clean tail gas stream 1503 passes through one or more filters 1302 and/or condensers 1303. Condensed water 1304 leaves the condensers 1303 and flows to the water treatment subsystem 1600 (see FIG. 16). A portion of the resulting dried clean tail gas stream may form a vent gas 1305 and flow to the venting subsystem 1700 (see FIG. 17), and another portion passes through a pump 1306 and is mixed with the combined feed gas stream to form a reaction gas 1307. The reaction gas 1307 receives heat from the clean tail gas stream 1503 in the heat exchanger 1301 before flowing to the fluidized-bed reaction subsystem 1400 shown in FIG. 14.

In the fluidized-bed reaction subsystem 1400, the reaction gas 1307 stream passes through a heat exchanger 1401 (e.g., a cross-flow gas-gas interchange heat exchanger) to extract heat from a tail gas stream 1404. Multiple heat exchangers may be utilized to achieve a selected amount of heat transfer. The heat exchanger 1401 includes materials appropriate for the temperatures and conditions therein, such as materials resistant to metal dusting corrosion. A heater 1402 provides additional heat to bring the reaction gas 1307 to reaction conditions prior to flowing into the reaction vessel 1403. The reaction gas 1307 flows into a reaction vessel 1403, wherein CNTs or other carbon products (e.g., nanodiamonds, graphite, carbon black, etc.) are formed. The reaction vessel 1403 may be ceramic-lined to mitigate the effects of metal dusting corrosion. The reactions that occur within the reaction vessel 1403 may be Bosch-type reactions at conditions that produce selected morphologies of solid carbon, such as those disclosed in U.S. Patent Application Publication No. 2012/0034150.

Figure 15:
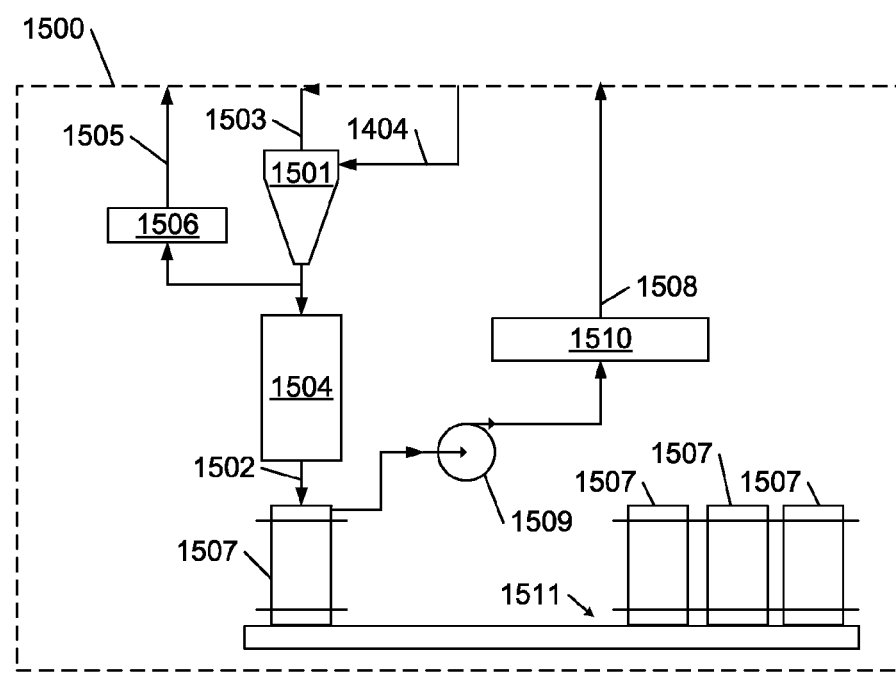
FIG. 15 is a simplified schematic diagram of a product separation and packaging subsystem for the system of FIG. 11.

The tail gas stream 1404 flows to the product separation and packaging subsystem 1500, as shown in FIG. 15. The tail gas stream 1404 enters a cyclone 1501, which separates the tail gas stream 1404 into a products stream 1502 and the clean tail gas stream 1503. The cyclone 1501 and flow lines connecting the reaction vessel 1403 to the cyclone 1501 may be ceramic-lined to limit or prevent metal dusting corrosion.

The products stream 1502 includes particles smaller than a selected size. For example, the cyclone 1501 may be configured to separate particles smaller than about 12 microns into the products stream 1502. The size of particles separated into the products stream 1502 depends on operating conditions and particle properties (e.g., shape and density). In some embodiments, the cyclone 1501 may be configured to separate various morphologies of carbon formed in the reaction vessel 1403. In some embodiments, the heat exchanger 1401 (FIG. 14) may be within the product separation and packaging subsystem 1500, such that the clean tail gas stream 1503 flows through the heat exchanger 1401.

The products stream 1502 passes through a cooling apparatus 1504. Some residual gases 1505, such as gases containing carbon oxides and potentially explosive reducing agents (e.g., hydrogen, methane, hydrocarbon gases), may pass through a filter 1506 and vent to a safe location (e.g., at the top of an exhaust stack).

After cooling, the products stream 1502 may be packaged in a shipping container 1507. In the process of packaging, residual gases 1508 may pass through a pump 1509 and a filter 1510 before venting. After the products are appropriately packaged for storage and shipping, the shipping containers 1507 may be moved to a shipping area 1511, such as a loading dock.

The water treatment subsystem 1600, shown in FIG. 16, receives the condensed water 1304 from the gas handling subsystem 1300 (see FIG. 13). The condensed water 1304 may pass through one or more filters 1601 to form a purified water stream 1602. The purified water stream 1602 may pass through one or more cooling devices 1603 (e.g., a cooling tower) en route to storage, municipal waste, or safe run-off.

The venting subsystem 1700, shown in FIG. 17 may include at least one vent 1701 in a safe location (e.g., at the top of an exhaust stack). For example, the vent 1701 may be configured to receive the vent gases 1305 from the gas handling subsystem 1300 (FIG. 13) and/or the residual gases 1505, 1508 from the product separation and packaging subsystem 1500 (FIG. 15).

Example 3

FIG. 18 depicts another system 1800 for producing solid carbon products of various morphologies. The system 1800 includes a gas supply subsystem 1900, a gas handling subsystem 2000, a reactor subsystem 2100, a product separation subsystem 2200, a water separation subsystem 2300, a water treatment subsystem 2400, a product packaging subsystem 2500, and a utilities subsystem 2600 (each shown in more detail in FIGS. 19 through 26). In FIGS. 18 through 26, solid arrows indicate the flow of materials (gas, liquid, etc.). Information also flows within and between various subsystems. The subsystems may be modified or combined, or may be added to with additional subsystems as fitting desired production processes. The subsystems may be positioned to improve operating economics and to make efficient use of space in a process facility. The subsystems may also include various instruments or equipment, such as valves, transducers, flow meters, switches, controllers, computers, etc. The gases referenced in this description are for example only and may be substituted for, and/or added to other gases. The assignment of specific mechanics to specific subsystems within the system is also for example only.

Figure 19:
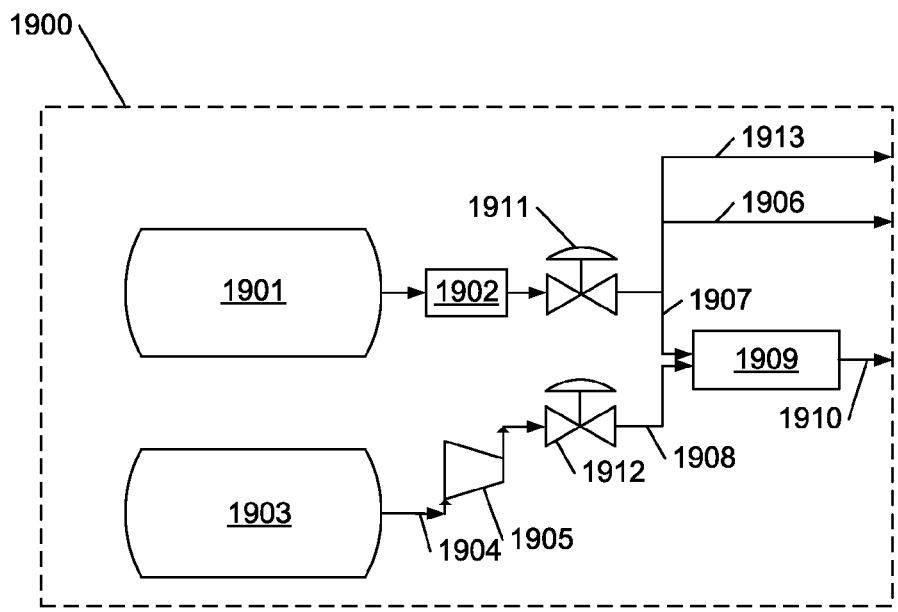
FIG. 19 is a simplified schematic diagram of a gas supply subsystem for the system of FIG. 18.

As depicted in FIG. 19, a supply of liquefied carbon oxide, for example carbon dioxide ($CO_2$) or carbon monoxide (CO) is provided from a carbon oxide source 1901 (e.g., a tank, pipeline, etc.) within the gas supply subsystem 1900. When conditions such as pressure and temperature are appropriate, the carbon oxide passes through a vaporizer 1902, which evaporates the carbon oxide to form carbon oxide gas. The carbon oxide gas is split into three portions 1906, 1907, 1913. A reducing gas source 1903 (e.g., a tank, pipeline, etc.) provides reducing gas stream 1904, such as methane ($CH_4$) of any selected purity. The carbon oxide and the reducing gas stream 1904 typically flow from cryogenic storage tanks and may pass through heaters to vaporize the liquids. The reducing gas stream 1904 may pass through at least one compressor or process gas blower 1905 to achieve a selected pressure. The reducing gas stream 1904 and one portion 1907 of the carbon oxide gas are mixed and heated in a heater 1909 to form a combined feed gas stream 1910. The combined feed gas stream 1910 and one portion 1906 of the carbon oxide gas flow to the gas handling subsystem 2000 (see FIG. 20), and the other portion 1913 of the carbon oxide gas flows to the reactor subsystem 2100 (see FIG. 21). One or more valves 1911, 1912 may control the flow of gases.

Figure 20:
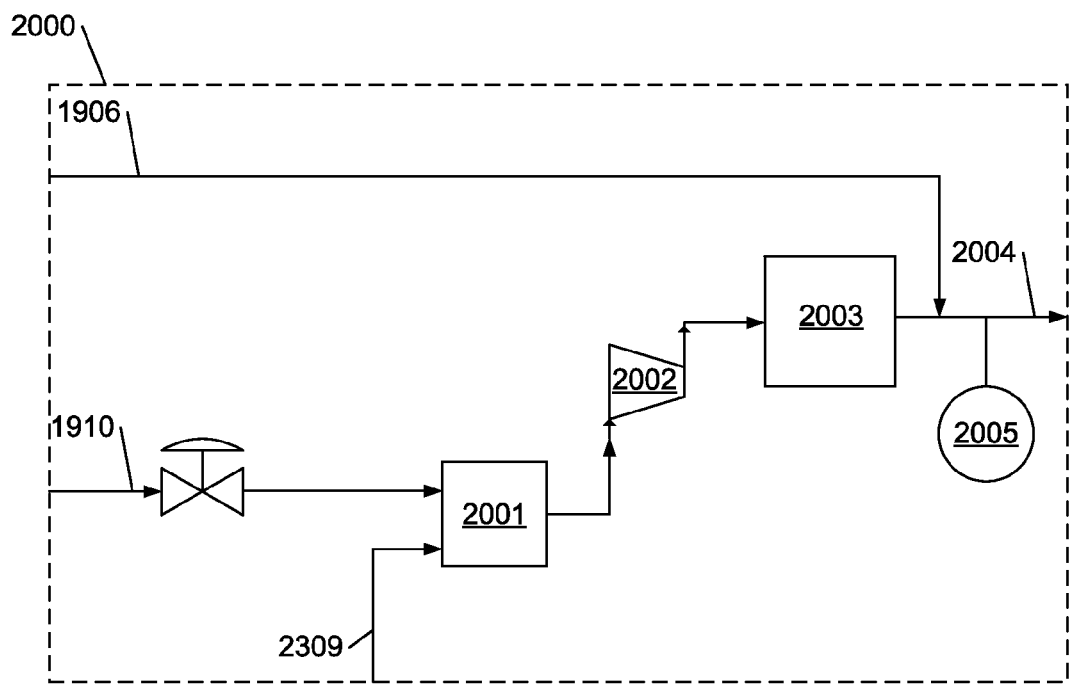
FIG. 20 is a simplified schematic diagram of a gas handling subsystem for the system of FIG. 18.
Figure 23:
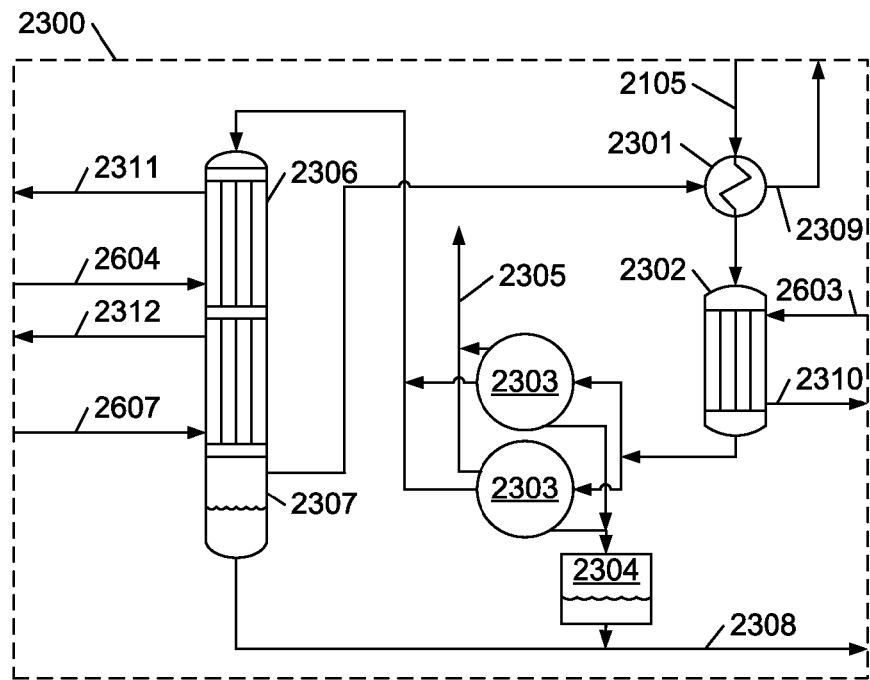
FIG. 23 is a simplified schematic diagram of a water separation subsystem for the system of FIG. 18.
Figure 24:
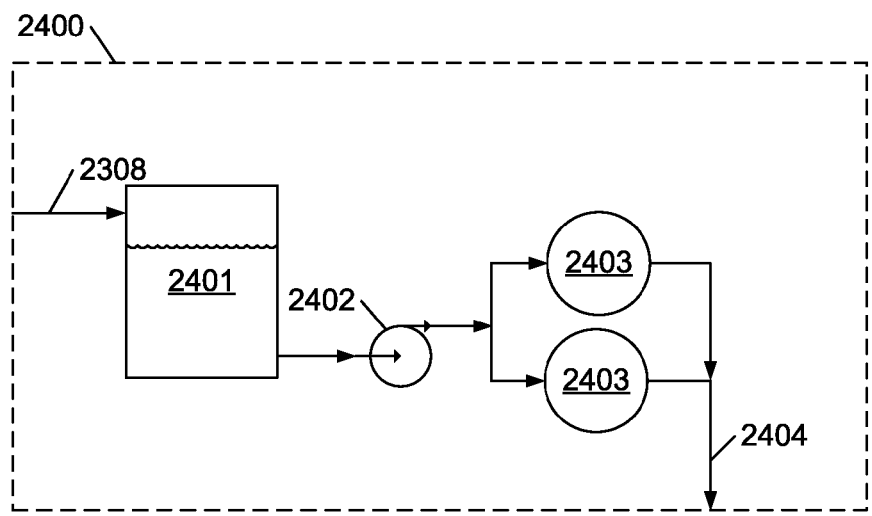
FIG. 24 is a simplified schematic diagram of a water treatment subsystem for the system of FIG. 18.

In the gas handling subsystem 2000, shown in FIG. 20, the combined feed gas stream 1910 is mixed with a recycle stream 2309 containing carbon oxide gas supplied by the water separation subsystem 2300 (see FIG. 23). The gases may be combined before or within a first tank 2001, before being compressed in a compressor or process gas blower 2002 to a suitable pressure to accommodate the pressure drop through the overall reactor system that the gas handling subsystem 2000 is designed to support. The compressed gas is transferred to a second tank 2003 for holding or further processing. The compressed gas mixes with the portion 1906 of the carbon oxide gas from the gas supply subsystem 1900 (FIG. 19) to form a combined feed gas stream 2004 under conditions such as temperature, pressure, concentration, and density selected for particular reactions. The conditions typically depend on the desired end product. The combined gas feed stream 2004 is analyzed by at least one analyzer 2005 to obtain information to control other components of the system 1800. The combined gas feed stream 2004 flows to the reactor subsystem 2100 (FIG. 21).

Figure 21:
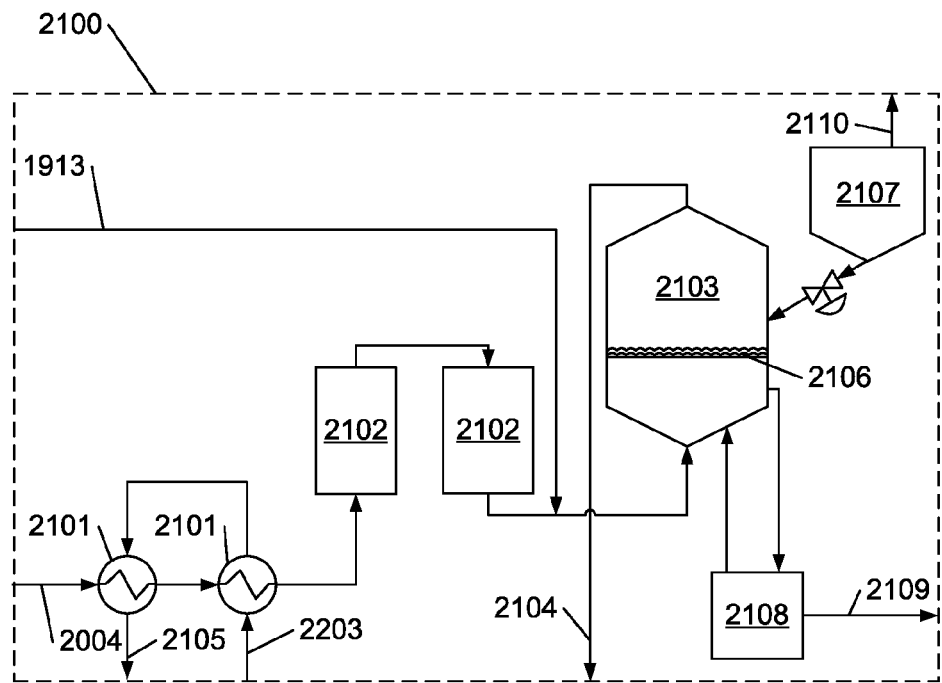
FIG. 21 is a simplified schematic diagram of a fluidized-bed reaction subsystem for the system of FIG. 18.

As shown in FIG. 21, the combined gas feed stream 2004 flows to the reactor subsystem 2100 and to at least one heat exchanger 2101 therein. The heat exchanger 2101 is typically a cross-flow heat exchanger configured for gas-gas interchange, and the combined gas feed stream 2004 receives heat from a warmer clean tail gas stream 2203 from a cyclone 2201 within the product separation subsystem 2200 (see FIG. 22). Multiple heat exchangers may be used to heat the combined gas feed stream; for example, two heat exchangers 2101 are shown in FIG. 21. The heat exchangers 2101 typically include materials selected for the process temperatures and to be resistant to metal dusting corrosion. In some embodiments, a small amount of water is added to one or more gas flow streams before the first heat exchanger 2101 to cause a fine deposit of metal oxide on surfaces of the heat exchangers 2101 to reduce or prevent metal dusting. The heat exchangers 2101 cool the clean tail gas stream 2203 to form a cooled clean tail gas stream 2105, which flows to the water separation subsystem 2300 (see FIG. 23).

The combined gas feed stream 2004 flows to at least one heater 2102 (e.g., an electric heater) to bring the reactants up to reaction conditions. A portion of the carbon oxide gas 1913 from the gas supply subsystem 1900 (FIG. 19) is mixed with the combined gas feed stream 2004 before the combined gas feed stream 2004 flows to a reactor 2103. The heater 2102 receives reaction feedback information from the reactor 2103 via one or more sensors. The reactor 2103 may be lined with a ceramic material to mitigate metal dusting corrosion therein. The reactions that occur within the reactor 2103 may be Bosch-type reactions at conditions that produce selected morphologies of solid carbon, such as those disclosed in U.S. Patent Application Publication No. 2012/0034150.

In the reactor 2103, the combined gas feed stream 2004 contacts catalyst material on a conveyor belt 2106. The reactor 2103 has an input to receive catalyst material from at least one hopper 2107 in communication with the reactor 2103 and an output to release catalyst material into a tank 2108. The conveyor belt 2106 moves catalyst material within the reactor 2013. Residual gases may flow from the tank 2108 back to the reactor 2103, or may form a vent gas 2109. The hopper 2107 may also release a vent gas 2110.

Figure 22:
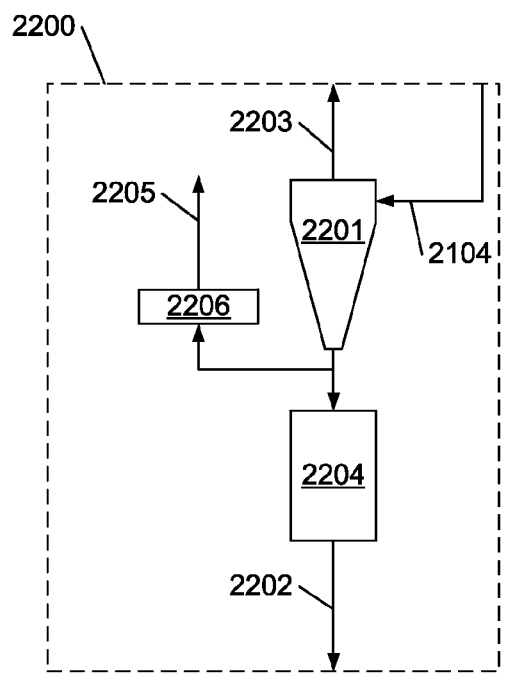
FIG. 22 is a simplified schematic diagram of a product separation subsystem for the system of FIG. 18.

A reactor tail gas stream 2104 flows from the reactor 2103 to a cyclone 2201 within the product separation subsystem 2200 (FIG. 22). The cyclone 2201 and flow lines connecting the reactor 2103 to the cyclone 2201 may be ceramic-lined to limit or prevent metal dusting corrosion. The cyclone 2201 separates the reactor tail gas stream 2104 into a products stream 2202, such as CNTs, and the clean tail gas stream 2203. The products stream 2202 includes particles smaller than a selected size. For example, the cyclone 2201 may be configured to separate particles smaller than about 12 microns into the products stream 2202. The size of particles separated into the products stream 2202 depends on operating conditions and particle properties (e.g., shape and density).

The clean tail gas stream 2105 flows to the water separation subsystem 2300 (FIG. 23), to another heat exchanger 2301 before entering a condenser 2302 (e.g., a one-stage water-cooled condenser). The clean tail gas stream 2105 passes through at least one filter 2303, where liquid water may be diverted into a holding tank 2304. After the clean tail gas stream 2105 passes through the filter 2303, a portion 2305 of the clean tail gas stream 2105 may be safely vented, and the remainder of the clean tail gas stream 2105 flows into a second condenser 2306.

The second condenser 2306 may be a two-stage condenser, in which a first stage is water-cooled and a second stage is glycol-cooled. After passing through the two-stage condenser 2306, condensed water may be held in a holding tank 2307 for a period of time before mixing with the output of the holding tank 2304. The condensed water 2308 flows to the water treatment subsystem 2400 (see FIG. 24) for further processing. As water is collected in the holding tank 2307, recycled gases 2309 flow back to the heat exchanger 2301, and finally to the tank 2001 within the gas handling subsystem 2000 (FIG. 20). The condensers 2302, 2306 in the water separation subsystem 2300 may be supplied by the utilities subsystem 2600 (see FIG. 26). In such embodiments, cooling water 2603, 2604 may flow to the first condenser 2302 and a first set of coils of the second condenser 2306, respectively. The cooling water returns 2310, 2311 flow back to the utilities subsystem 2600. Chilled glycol 2607 flows to a second set of coils of the second condenser 2306, and glycol return 2312 flows back to the utilities subsystem 2600.

Within the water treatment subsystem 2400 (FIG. 24), a tank 2401 accumulates the condensed water 2308 from the water separation subsystem 2300. The tank 2401 may systematically release water to a pump 2402, such as through a port in or near the bottom of the tank 2401. The pump 2402 directs the condensed water 2308 through one or more filters 2403 to form a purified water stream 2404. The purified water stream 2404 then passes to storage, municipal waste, or a safe run-off.

Figure 25:
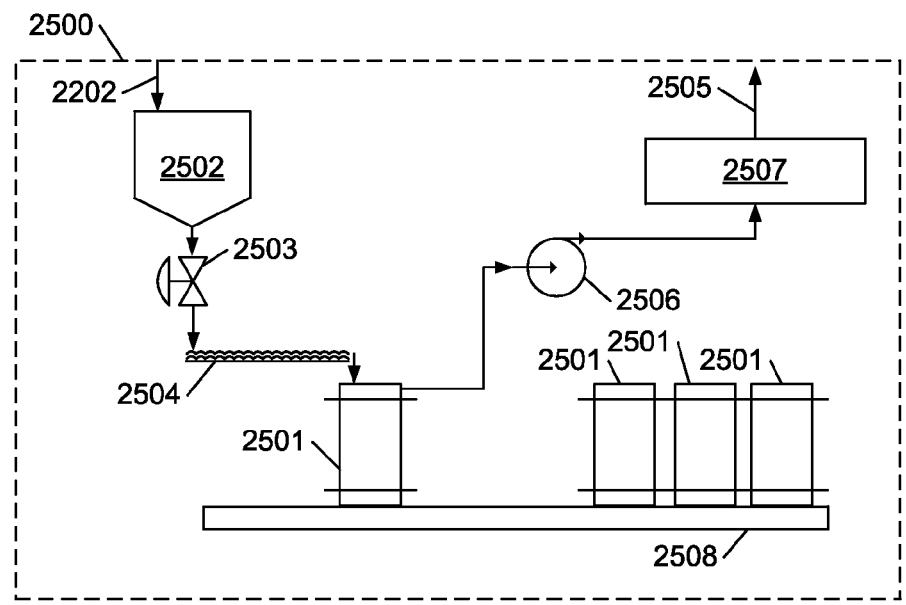
FIG. 25 is a simplified schematic diagram of a product packaging subsystem for the system of FIG. 18.

The product packaging subsystem 2500, shown in FIG. 25, transfers the products stream 2202 to a shipping package 2501. In the process of packaging, the products stream 2202 may flow to a hopper 2502, through a valve 2503, onto a conveyor belt 2504, and into the shipping package 2501. Residual gases 2505 may pass through a pump 2506 and filter 2507 before venting. After the products are packaged, shipping packages 2501 may be moved to a shipping area 2508.

Figure 26:
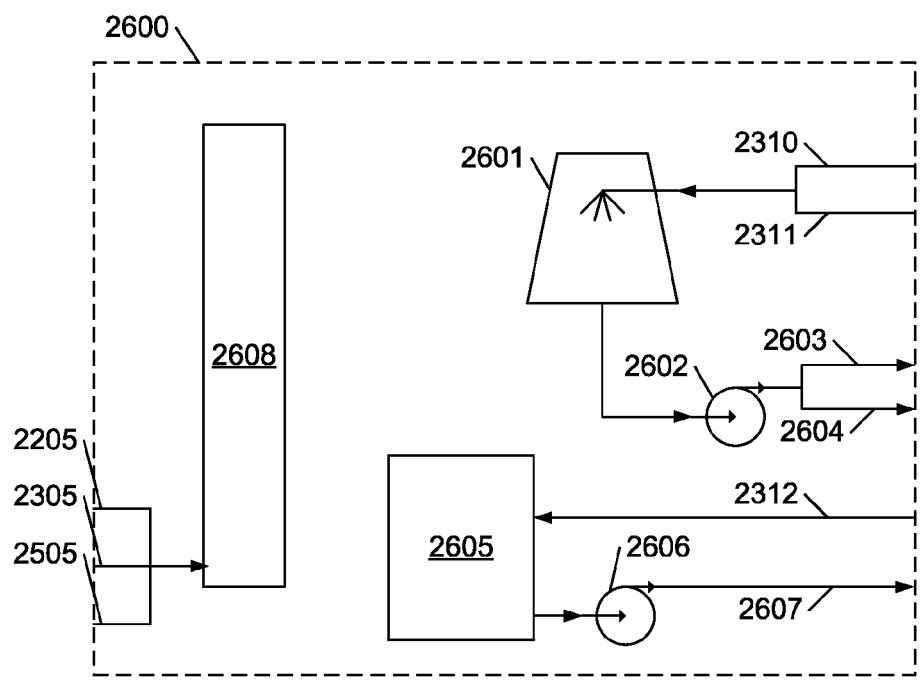
FIG. 26 is a simplified schematic diagram of a utilities subsystem for the system of FIG. 18.

The utilities subsystem 2600, shown in FIG. 26, may interact with and support other subsystems of the system 1800. For example, the utilities subsystem 2600 may include a cooling tower 2601 configured to receive cooling water from the water separation subsystem 2300 (FIG. 23). Heat is removed from the cooling water returns 2310, 2311 in the cooling tower 2601. The cooling water 2603, 2604 is recycled via a pump 2602 back to the water separation subsystem 2300. A chiller 2605 receives the glycol return 2312 from the water separation subsystem 2300. A glycol pump 2606 recycles the chilled glycol 2607 to the water separation subsystem 2300. The utilities subsystem 2600 may also include at least one vent 2608 in a safe location. For example, the vent 2608 may be configured to receive the residual gases 2205 from the product separation subsystem 2200, the portion of the tail gas stream 2305 from the water separation subsystem 2300, and/or the residual gases 2505 from the product packaging subsystem 2500. The utilities subsystem 2600 may also include other operations, sensors, or controls as necessary for the system 1800 to function.

What is claimed is:

1. An apparatus for producing solid carbon by catalytically reducing carbon oxides using a reducing agent, comprising:
    a reactor configured to receive a dried recycle gas, a fresh feed gas comprising at least one carbon oxide, and at least one reducing agent, the reactor comprising:
        at least one mixing means configured to mix the dried recycle gas, the fresh feed gas, and the at least one reducing agent to form a combined feed gas;
        at least one heat exchanger configured to heat the combined feed gas to a first temperature by recovering heat from at least one other higher-temperature process stream of the apparatus;
        at least one heater configured to further heat the combined feed gas to a second temperature higher than the first temperature;
        a reaction vessel configured to receive the heated combined feed gas, the reaction vessel further configured to maintain predetermined reaction conditions of temperature and pressure and to contain a catalyst; and
        at least one discharge of raw tail gas comprising unreacted gases, reaction product gases, entrained solid carbon, and water;
    a product separator configured to receive the raw tail gas from the reaction vessel and to separate the raw tail gas into a clean tail gas and a products stream comprising solid carbon, wherein the product separator is configured to pass the products stream through a cooling heat exchanger lock drum;
    a water separation unit configured to receive the clean tail gas from the product separator and to remove at least a portion of the water in the clean tail gas to form a dried recycle gas, the water separation unit comprising:
        a first condenser configured to receive the clean tail gas and to cool the clean tail gas to condense water from the clean tail gas; and
        a water discharge system for removing the water from the apparatus; and
    a product receiving unit configured to receive the products stream from the cooling heat exchanger lock drum.

2. The apparatus of claim 1, wherein the reactor further comprises at least one control system feedback loop configured to monitor and control a reaction temperature in the reaction vessel and the at least one heater.

3. The apparatus of claim 1, further comprising a hopper in communication with the reactor vessel and configured to deliver fresh catalyst to the reaction vessel.

4. The apparatus of claim 1, wherein the product separator comprises at least one of a cyclone, a bag house, and a scrubber.

5. The apparatus of claim 1, wherein the product separator comprises a water-gas conversion reactor configured to oxidize solid carbon to a carbon oxide and hydrogen by addition of water.

6. The apparatus of claim 1, further comprising a water treatment system comprising a tank, a pump, and at least one filter configured to remove impurities from water condensed in the water separation unit.

7. The apparatus of claim 1, wherein the first condenser comprises at least one of a water-cooled condenser, and air-cooled condenser, or a refrigerated condenser.

8. The apparatus of claim 1, wherein the product-receiving unit comprises a product-receiving silo or hopper, a transfer means configured to deliver the product from the product-receiving silo or hopper to an enclosed package loading unit, and a blower-and-filter system configured to remove solid carbon from gases in the product-receiving unit.

9. The apparatus of claim 1, further comprising at least one air-handling device selected from the group consisting of compressors and process gas blowers, the at least one air-handling device configured to compress the dried recycle gas, a portion of the fresh feed, and the reducing agent to form the combined feed gas at a predetermined pressure.

10. The apparatus of claim 9, wherein the at least one air-handling device is configured to pass the combined feed gas to a storage or surge tank, wherein an output of the storage or surge tank is configured to deliver the combined feed gas to the reactor.

11. The apparatus of claim 9, wherein the water separation unit further comprises a first output configured to pass the dried recycle gas to the at least one air-handling device.

12. The apparatus of claim 1, further comprising at least one analyzer configured to analyze at least one parameter of the combined feed gas and to provide an analytical result to at least one of a gas-flow control valve, an air-handling device, a pump, a switch, the first heat exchanger, the at least one heater, the at least one mixing means, the product separator, the second heat exchanger, the first condenser, and the second condenser.

13. The apparatus of claim 1, wherein the water separation unit further comprises a second condenser to further cool the clean tail gas and form the dried recycle gas.

14. The apparatus of claim 13, wherein the second condenser comprises at least one of a refrigerated condenser, a water-cooled condenser, or an air-cooled condenser.

15. The apparatus of claim 13, wherein the second condenser comprises a refrigerated condenser configured to operate at a temperature selected to control a vapor pressure of water in the dry recycle gas to optimize the type of carbon product produced and avoid catalyst poisoning.

16. The apparatus of claim 15, wherein the refrigerated condenser is configured to operate at a temperature below about 0° C.

17. The apparatus claim 1, wherein the at least one mixing means is located downstream from the at least one heat exchanger.

18. The apparatus claim 1, wherein the at least one mixing means comprises at least one of a static mixer, a section of a feed line, and a section of the reactor.

19. An apparatus for producing solid carbon by catalytically reducing carbon oxides using a reducing agent, the apparatus comprising:
a gas supply source configured to provide a mixed fresh feed gas comprising at least one carbon oxide and at least one reducing agent in a predetermined ratio and at a first predetermined pressure;
a gas handling system having a recycled gas input configured to receive a recycled gas and the mixed fresh feed gas, the gas handling system comprising:
at least one air-handling device configured to compress the recycled gas and the mixed fresh feed gas to form a compressed gas at a second predetermined pressure and to pass the compressed gas to a surge tank or drum;
an output port configured to combine the compressed gas from the surge tank or drum with another carbon oxide feed to form a combined feed gas; and
at least one gas-composition analyzer configured to analyze at least one parameter of the combined feed gas; and
a control system feedback loop configured to use the at least one parameter of the combined feed gas to regulate a composition of the combined feed gas;
a reactor configured to receive the combined feed gas, the reactor comprising:
at least one first heat exchanger configured to heat the combined feed gas using heat captured from a clean tail gas;
at least one heater configured to further heat the combined feed gas;
at least one reaction vessel configured to receive the combined feed gas, the reaction vessel configured to contain a catalyst and to maintain predetermined composition and reaction conditions to form a reactor tail gas that contains a reaction product and unreacted gases; and
a control system feedback loop configured to monitor and control reaction conditions in the reaction vessel;
a product separator comprising:
a product separation cyclone configured to receive the reactor tail gas and separate the reactor tail gas into a product and the clean tail gas, the product comprising a solid carbon;
a product outlet port configured to pass the product from the product separation cyclone through a cooling heat exchanger; and
a clean tail gas outlet port configured to pass the clean tail gas from the product separation cyclone to the at least one first heat exchanger of the reactor;
a water separator comprising:
at least one second heat exchanger configured to receive the clean tail gas from the at least one first heat exchanger;
a water-cooled condenser configured to cool the clean tail gas;
at least one filter configured to remove particulate material from the clean tail gas after the clean tail gas passes through the water-cooled condenser and having an output for a first condensed water; and
a two-stage condenser configured to receive the clean tail gas from the at least one filter and to form a second condensed water and the recycled gas, the two-stage condenser further configured to pass the recycled gas to the at least one second heat exchanger;

a water treatment system configured to receive the first condensed water and the second condensed water, the water treatment system comprising a tank, a pump, and at least one filter to remove impurities from the first condensed water and the second condensed water;

a product packaging system configured to receive the product and comprising at least one loading unit, a blower-and-filter system to remove impurities from air in a product packaging area, and access to a product shipping area; and a utility support system configured to provide a cyclic cooling water supply and return for the water-cooled condenser and the two-stage condenser, a cyclic glycol supply and return for the two-stage condenser, and at least one vent configured to release filtered gases.

20. An apparatus for producing solid carbon by reducing carbon oxides using a reducing agent, the apparatus comprising:

a gas supply system configured to deliver a first fresh feed gas comprising at least one carbon oxide gas at a first predetermined pressure and a second fresh feed gas comprising at least one reducing agent at a second predetermined pressure;

a gas handling system comprising:
  a fresh feed gas input line configured to mix the first fresh feed and the second fresh feed gas to form a combined fresh feed;
  an input line for a recycled compressed gas configured to mix the recycled compressed gas with the combined fresh feed gas to form a combined feed gas;
  at least one first heat exchanger configured to transfer heat from a clean tail gas to the combined feed gas;
  at least one filter configured to remove particulate material from the clean tail gas;
  at least one condenser configured to remove water from the clean tail gas, the at least one condenser having at least one output line configured to release water;
  at least one output line through which excess gases from the clean tail gas may be exhausted; and
  at least one air-handling device configured to compress the recycled gas to a predetermined pressure to form the recycled compressed gas;

a reactor configured to receive the combined feed gas, the reactor comprising:
  at least one second heat exchanger configured to transfer heat from a reactor tail gas to the combined feed gas;
  at least one heater configured to further heat the combined feed gas; and
  at least one reaction vessel configured to receive the combined feed gas, the reaction vessel configured to maintain predetermined composition and reaction conditions and to contain a catalyst, wherein the reactor tail gas formed in the at least one reaction vessel contains reaction product gases, solid carbon, water, and unreacted gases;

a product separating and packaging system comprising:
  a product separator configured to separate the solid carbon from the reactor tail gas into a product and the clean tail gas;
  a product outlet port configured to pass the product from the product separator through a cooling heat exchanger to a product packaging area; and
  a clean tail gas outlet port configured to pass the clean tail gas from a product separation cyclone to the at least one first heater within the gas handling system; and
  wherein the product packaging area comprises at least one loading unit, a blower-and-filter system to remove impurities from the air, and access to a product shipping area;

a water treatment system comprising at least one tank configured to hold the water removed from the clean tail gas before discharging the water to a drain; and a venting system comprising at least one exhaust stack configured to received excess gases from the at least one output line of the gas handling system and to release gases to a safe location.

* * * * *